United States Patent [19]

Ishibashi et al.

[11] Patent Number: 5,103,761

[45] Date of Patent: Apr. 14, 1992

[54] COATING APPARATUS

[75] Inventors: Ichirou Ishibashi; Kiyohiro Ichinose; Toru Yamamoto; Toshikazu Kashida, all of Sayama, Japan

[73] Assignee: Honda Giken Kogyo Kabushiki Kaisha, Tokyo, Japan

[21] Appl. No.: 572,630

[22] Filed: Aug. 27, 1990

Related U.S. Application Data

[62] Division of Ser. No. 356,946, May 25, 1989.

[30] Foreign Application Priority Data

| May 26, 1988 | [JP] | Japan | 63-129759 |
| May 26, 1988 | [JP] | Japan | 63-129760 |
| Jun. 1, 1988 | [JP] | Japan | 63-73650 |
| Mar. 13, 1989 | [JP] | Japan | 1-60389 |

[51] Int. Cl.⁵ ............................. B05B 3/00
[52] U.S. Cl. ............................. 118/323; 118/324; 239/227; 239/243
[58] Field of Search ........... 239/587 X, 243 X, 227 X, 239/263.1, 263.3, 227, 243, 587; 901/43; 118/313, 321, 323, 631, 674, 680, 681, 324

[56] References Cited

U.S. PATENT DOCUMENTS

| 2,900,950 | 8/1959 | Peeps . | |
| 3,027,273 | 3/1962 | Sacks . | |
| 3,402,697 | 9/1968 | Kock . | |
| 3,496,908 | 2/1970 | Bernardi . | |
| 3,509,852 | 5/1970 | Wells . | |
| 3,533,422 | 10/1970 | Alimanestiano . | |
| 3,561,398 | 2/1971 | Rose | 118/680 |
| 3,619,311 | 11/1971 | Rose et al. . | |
| 3,703,880 | 11/1972 | Wampler | 118/323 |
| 3,742,906 | 7/1973 | Dupke . | |
| 3,752,117 | 8/1973 | Hammelmann | 118/323 |
| 3,874,595 | 4/1975 | Rindisbacher | 118/823 |
| 3,924,565 | 12/1975 | Benner et al. | 118/323 |
| 4,209,557 | 6/1980 | Edwards | 427/373 |
| 4,278,046 | 7/1981 | Clark et al. . | |
| 4,421,800 | 12/1983 | Schoenberg | 118/679 |
| 4,578,965 | 4/1986 | Brossman | 118/323 |
| 4,590,654 | 5/1986 | Kajiura | 29/407 |
| 4,762,013 | 8/1988 | Peter et al. | 239/243 |

FOREIGN PATENT DOCUMENTS

| 84523A3 | 7/1983 | Fed. Rep. of Germany . | |
| 54-37972 | 11/1979 | Japan . | |
| 57-25758 | 7/1980 | Japan . | |
| 58-22262 | 5/1983 | Japan . | |
| 62-87762 | 6/1987 | Japan . | |
| 1548006 | 3/1990 | U.S.S.R. | 901/43 |
| 806765 | 12/1958 | United Kingdom . | |
| 1322861 | 7/1973 | United Kingdom . | |
| 2200304 | 8/1988 | United Kingdom . | |

*Primary Examiner*—Willard Hoag

[57] ABSTRACT

A plurality of paint spray guns are directed substantially perpendicularly toward respective vertically divided surfaces of a side panel of a workpiece such as an automotive body. The paint spray guns are spaced in a direction in which the workpiece is delivered and being disposed at different heights, respectively. Paint sprays are ejected from the paint spray guns toward the workpiece which is being delivered in the direction. Simultaneously, the paint spray guns are displaced back and forth perpendicularly to the direction and substantially parallel to the surfaces of the side panel to coat the surface respectively with the paint spray guns, thereby coating the side panel.

2 Claims, 23 Drawing Sheets

COATING APPARATUS

This application is a divisional of copending application Ser. No. 356,946, filed on May 25, 1989.

BACKGROUND OF THE INVENTION

The present invention relates to a coating method and apparatus, and more particularly a method of and an apparatus for coating surfaces such as side panels, an engine hood, a roof, etc., of an automotive body, for example, with a plurality of paint spray guns in a short period of time and with high accuracy.

The automobile industry in recent years employs highly automated line production processes for efficiently mass-producing automobile products. There are used considerably automated coating apparatus devices for applying desired paint coatings to automotive bodies.

Various methods have heretofore been employed for automatically painting or coating automotive bodies. One known coating method is disclosed in Japanese Patent Publication No. 54-37972, for example.

A coating apparatus for carrying out the coating method disclosed in the above publication is illustrated in FIG. 1 of the accompanying drawings. The coating apparatus, generally indicated by the reference numeral 2, includes a portal frame 4, a pair of side coating mechanisms 6a, 6b disposed on sides of the legs of the frame 4, and an upper coating mechanism 8 mounted on an upper wall of the frame 4. The side coating mechanisms 6a, 6b have paint spray guns 10a, 12a and 10b, 12b, respectively, which are fixed to arms 16a, 16b movable along accurate guide grooves 14a, 14b defined in the side coating mechanisms 6a, 6b. Although not shown, the upper coating mechanism 8 also has paint spray guns identical to the paint spray guns 10a, 12a and 10b, 12b.

When an automotive body W is delivered at a certain speed by a conveyor 18 into the portal frame 4, the side coating mechanisms 6a, 6b and the upper coating mechanism 8 are operated to displace the arms 16a, 16b along the accurate guide grooves 14a, 14b. At the same time, different paint sprays are ejected from the paint spray guns 10a, 12a and 10b, 12b on the arms 16a, 16b onto side panels of the automotive body W in overlapping patterns, and paint sprays are also ejected from the paint spray guns of the upper coating mechanism 8 onto the roof of the automotive body W, thus coating the automotive body W.

In the prior coating apparatus 2, the arms 16a, 16b with the paint spray guns 10a, 12a and 10b, 12b are displaceable along the guide grooves 14a, 14b which are shaped to match the configuration of the side panels of the automotive body W. If an automotive body W of a different type or shape is to be coated with the coating apparatus 2, however, the paint spray guns 10a, 12a and 10b, 12b cannot be displaced accurately along the side panels of the automotive body W, resulting in a coating failure or trouble Therefore, when an automotive body W of a different design is to be coated accurately, another plurality of coating mechanisms 6a, 6b having paint spray guns 10a, 12a and 10b, 12b displaceable along the shape of the automotive body W must be employed. This is disadvantageous in that the cost of the coating apparatus required to coat automotive bodies having different configurations is high.

The side panels of the automotive body W are coated by moving the paint spray guns 10a, 12a and 10b, 12b from lower to upper ends of the side panels. It is thus necessary to cause the conveyor 18 to deliver the automotive body W at a considerably low speed. This coating process is, however, low in efficiency.

Paint sprays of one type may be applied to the automotive body W from the paint spray guns 10a, 12a. If the automotive body W is coated by an electrostatic painting process, however, the particles of the paint sprays ejected from the paint spray guns 10a, 12a which are located closely to each other are repelled from each other, and the automotive body W cannot be coated highly accurately.

Another apparatus for automatically coating an automotive body is disclosed in Japanese Laid-Open Utility Model Publication No. 57-25758, for example.

The disclosed coating apparatus has a plurality of paint spray guns mounted on a frame extending transversely across the automotive body and displaceable transversely and vertically with respect to the automotive body. While the automotive body is being fed at a given speed, the frame is vertically moved along the upper surface configuration of the automotive body and also reciprocally moved transversely across the automotive body. At the same time, paint sprays are ejected from the paint spray guns to coat the upper surfaces of the automotive body.

The upper surfaces of the automotive body to be coated include an engine hood, pillars, a roof, and a trunk lid, the roof usually having a width or transverse dimension smaller than those of the engine roof and the trunk lid. The paint spray guns are positioned to cover the surface having the maximum width, e.g., the engine hood. The engine hood, the pillars, the roof, and the trunk lid are coated by the paint spray guns which they are being displaced in unison. Because the surfaces to be coated have different widths, however, when the roof is coated by the paint spray guns which have been positioned to cover the engine hood, the paint spray guns are displaced toward positions where no coating is required as the roof is narrower than the engine hood. More paint than is necessary to coat the roof is thus applied to the roof by the paint spray guns. Such a coating process is quite uneconomical due to the wasteful consumption of paint.

When coating narrow and slanted surfaces such as the pillars, it is difficult to move the paint spray guns precisely along these surfaces While these surfaces are being coated, a coating failure tends to occur, and more paint than necessary is consumed.

In the latter coating apparatus, a mechanism for displacing the frame with the paint spray guns thereon back and forth in the transverse direction of the automotive body is usually in the form of a crank mechanism since it is simple in structure and small in size. The crank mechanism includes a rotor coupled to a rotative drive source such as a motor and a rod having one end joined eccentrically to the rotor and the other end connected to the frame. By rotating the rotor with the rotative drive source, the frame is moved reciprocally to displace the paint spray guns back and forth in the transverse direction of the automotive body.

When the paint spray guns are displaced back and forth by the crank mechanism, the paint spray guns are moved at a speed V indicated as follows:

$$V = \omega Y \sin \omega t \tag{1}$$

where $\omega$ is the angular velocity of the end of the rod which is joined to the rotor and Y is the radius of curvature of a circular path along which said end of the rod moves. As indicated by the above equation, each paint spray gun moves along a sine curve. Consequently, as shown in FIG. 2, each paint spray gun, denoted at 20, is moved at a higher speed in the centra portion of its stroke than at the opposite ends of the stroke. If a paint spray 22 is ejected from the paint spray gun 20 uniformly with respect to time, opposite ends 26a, 26b of a paint coating 26 applied to a surface 24 are raised, i.e., higher than the rest of the paint coating 26. Accordingly, the paint coating 26 cannot be applied in a uniform thickness, and hence is either low in quality or defective.

Japanese Patent Publication No. 58-22262 or Japanese Laid-Open Utility Model Publication No. 62-87762 shows still another apparatus for automatically coating an automotive body. According to this prior coating apparatus, a portal frame extends transversely across the automotive body and is displaceable in the transverse and vertical direction with respect to the automotive body, and a plurality of paint spray guns are mounted on the frame. While the automotive body is being led at a certain speed, the paint spray guns apply paint coatings to surfaces of the automotive body.

In general, the coating apparatus is placed in a coating booth in which an air flow is developed vertically downwardly. The downward air flow forcibly lowers excessive paint particles to prevent them from being applied to the automotive surfaces.

The frame is of a portal shape and its horizontal member has a relatively large prismatic shape. Therefore, the air flow hits the horizontal surface of the frame and becomes a turbulent air flow. As a consequence, paint particles are caused by the turbulent air blow to be suspended in the coating booth and eventually applied to the automotive body, or even to enter the mechanism of the coating apparatus, thereby obstructing smooth operation of the coating apparatus.

SUMMARY OF THE INVENTION

It is a primary object of the present invention to provide a coating method and apparatus capable of coating surfaces of a workpiece such as an automotive body highly efficiently and accurately with paint spray guns.

Another object of the present invention is to provide a method of coating a side panel of a workpiece, comprising the steps of: directing a plurality of paint spray guns substantially perpendicularly toward respective vertically divided surfaces of the side panel, said paint spray guns being spaced in a direction in which the workpiece is delivered and being disposed at different heights, respectively; ejecting paint sprays from said paint spray guns toward the workpiece which is being delivered in said direction; and simultaneously displacing said paint spray guns back and forth perpendicularly to said direction and substantially parallel to said surfaces of the side panel to coat said surfaces respectively with said paint spray guns, hereby coating said side panel.

Still another object of the present invention is to provide a method of coating a surface of a workpiece, comprising the steps of: spacing a plurality of paint spray guns from the surface of the workpiece which is delivered in a direction, said paint spray guns being disposed perpendicularly to said direction; ejecting paint sprays from said paint spray guns toward the workpiece which is being delivered; then spacing said paint spray guns from the surface of the workpiece while varying distances between said paint spray guns so as to cover the shape of said surface of the workpiece; and ejecting paint sprays from said paint spray guns toward the workpiece for thereby coating at least one of front, upper, and rear portions of the workpiece.

Yet another object of the present invention is to provide an apparatus for coating a side panel of a workpiece, comprising: a unit body displaceable in a direction perpendicular to a direction in which the workpiece is delivered and also in a vertical direction with respect to the workpiece; an arm mounted on said unit body for angular movement and back-and-forth movement with respect to said unit body; and a paint spray gun mounted on said arm and movable back and forth substantially parallel to a surface of the side panel to be coated while being directed substantially perpendicularly to the surface of the side panel.

Yet still another object of the present invention is to provide the coating apparatus further including a bracket rotatably mounted on said unit body, a cylindrical member mounted on said bracket, and an actuator for moving said arm into and cut of said cylindrical member.

A further object of the present invention is to provide the coating apparatus wherein a plurality of unit bodies are displaceably disposed and spaced in said direction in which the workpiece is delivered, a plurality of arms mounted respectively on said unit bodies, and a plurality of paint spray guns mounted on said arms, respectively, and having different heights, respectively, for coating respective vertically divided surfaces of said side panel of the workpiece, thereby coating the side panel.

A yet further object of the present invention is to provide an apparatus for coating a workpiece, comprising: an arm extending perpendicularly to a direction in which the workpiece is delivered, said arm being angularly movable and/or vertically movable with respect to the workpiece; and a plurality of paint spray guns mounted on said arm and movable by an actuator to vary distances between said paint spary guns.

A still further object of the present invention is to provide the coating apparatus further including an attachment by which said paint spray guns are mounted on said arm, and a threaded shaft having differently threaded portions operatively coupled to said paint spray guns, respectively, said actuator comprising a rotative drive source coupled to said threaded shaft for rotating the threaded shaft about its own axis to vary said distances between said paint spray guns.

A yet still further object of the present invention is to provide the coating apparatus further including a slide sleeve mounted on said arm and movable back and forth perpendicularly to said direction, said paint spray guns being mounted on said slide sleeve.

Another object of the present invention is to provide the coating apparatus where at least one of said paint spray guns is fixed to said slide sleeve, and those paint spray guns which are adjacent to said one paint spray gun being movable back and forth with respect to said one paint spray gun.

It is also an object of the present invention to provide an apparatus for coating a workpiece, comprising: a coating booth; a support disposed in said coating booth and angularly displaceable with respect to a path in which the workpiece is delivered; a plurality of paint spray guns supported on said support; and a cover covering said support and having a flat or curved surface which is slanted at an angle with respect to an air flow forcibly supplied downwardly into said coating booth.

Still another object of the present invention is to provide the coating apparatus wherein said cover comprises a lower cover member disposed below said support and an upper cover member disposed above said support, said lower cover member having ends directed upwardly, said upper cover member having ends extending outwardly and downwardly of said ends of the lower cover member, with gaps defined between the ends of said lower and upper cover members.

Yet another object of the present invention is to provide an apparatus for coating a workpiece, comprising: at least one paint spray gun; a crank mechanism operatively coupled to said paint spray gun for moving the paint spray gun back and forth; said crank mechanism including a rod having an end coupled to said paint spray gun, and a rotatable member to which an opposite end of said rod is eccentrically connected; and an actuator mechanism for varying the angular velocity of said rotatable member to control the speed at which said paint spray gun is moved back and forth, so as to be substantially constant in a predetermined range.

Yet still another object of the present invention is to provide the coating apparatus wherein said actuator mechanism has a rotative drive source, a drive shaft connected to said rotative drive source, a driven shaft connected to said rotatable member, and a universal joint operatively interconnecting said drive and driven shafts, said drive and driven shafts being inclined at an angle from each other.

A further object of the present invention is to provide the coating apparatus wherein said angle ranges substantially from 135° to 150°.

A still further object of the present invention is to provide the coating apparatus wherein said actuator mechanism has a rotative drive source operatively connected to said rotatable member, and means for electrically controlling said rotative drive source to vary the angular velocity of said rotatable member.

The above and other objects, features and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENTS

Figure 1:
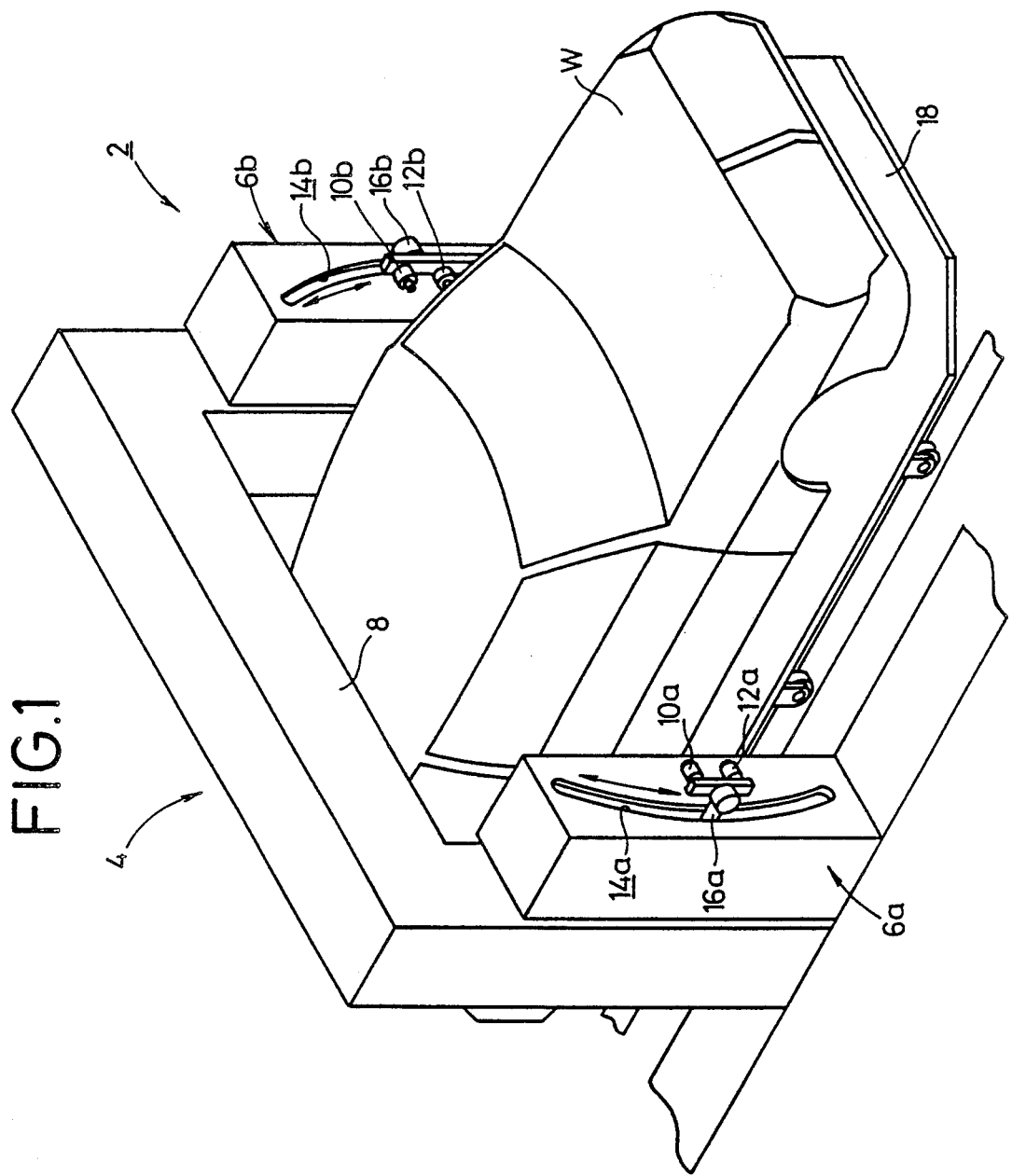
FIG. 1 is a schematic perspective view of a coating apparatus for carrying out a conventional coating method.
Figure 2:
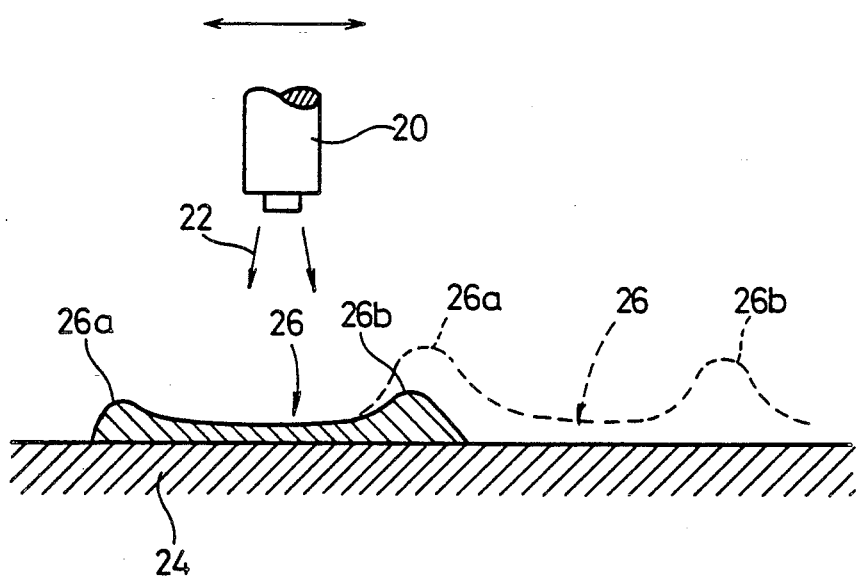
FIG. 2 is an enlarged schematic view showing the manner in which the conventional coating apparatus operates.
Figure 3:
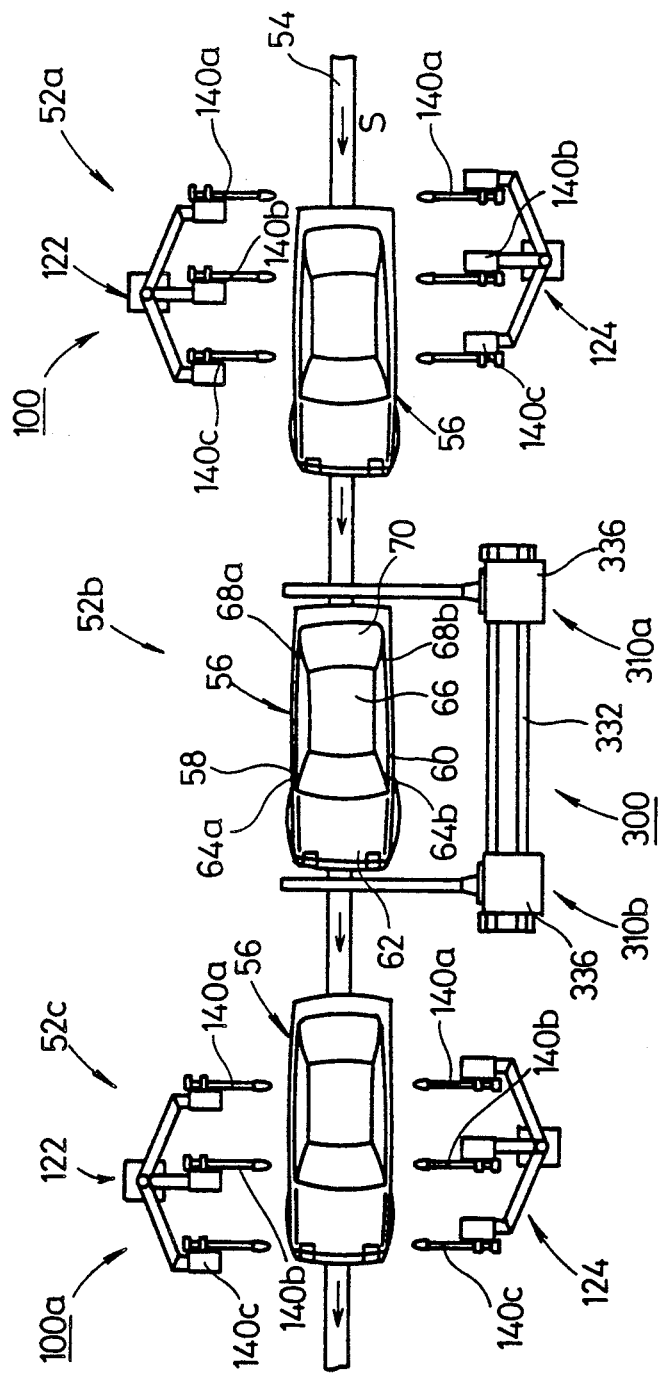
FIG. 3 is a schematic plan view of a coating line incorporating a coating apparatus for carrying out a coating method according to the present invention.

FIG. 3 schematically shows a coating line incorporating a coating apparatus for carrying out a method of coating an automotive body according to an embodiment of the present invention. The coating line, generally indicated at 50, includes a first station 52a, a second station 52b, and a third station 52c, and a conveyor 54 extends along and through these stations 52a through 52c. The conveyor 54 serves to deliver an automotive body 56 in the direction indicated by the arrow S. The automotive body 56 includes righthand and lefthand side panels 58, 60 each including front and rear doors, an engine hood 62, front pillars 64a, 64b, a roof 66, rear pillars 68a, 68b, and a trunk lid 70.

The first station 52a has a first side coating apparatus 100 for coating the righthand and lefthand side panels 58, 60 of the automotive body 56. The second station 52b has an upper coating apparatus 300 for coating the engine hood 62, the front pillars 64a, 64b, the roof 66, the rear pillars 68a, 68b, and the trunk lid 70. The third station 52c has a second side coating apparatus 100a. The first side coating apparatus 100, the upper coating apparatus 300, and the second side coating apparatus 100a are enclosed in a coating booth 80 (FIG. 4).

Figure 4:
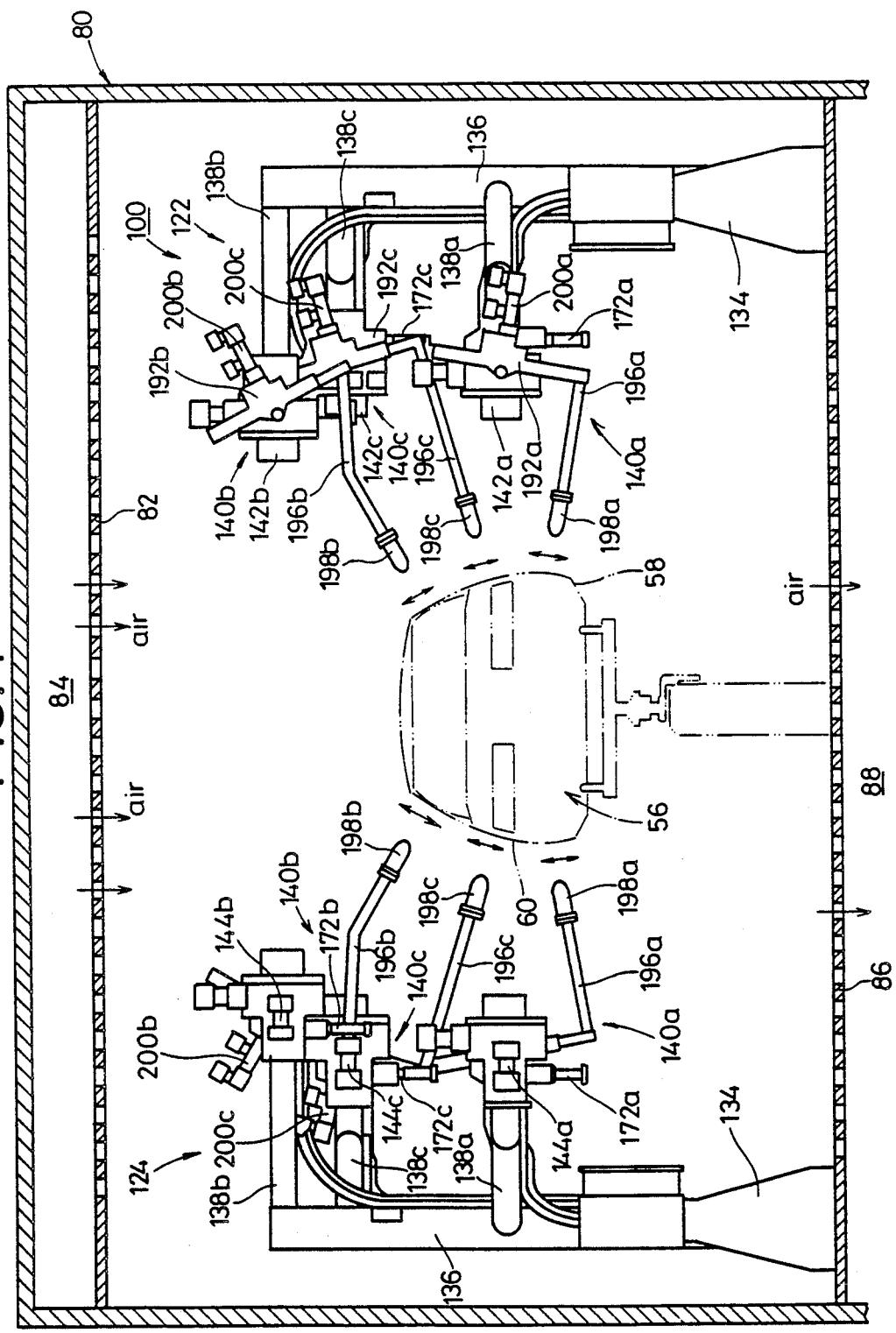
FIG. 4 is a schematic front elevational view of a side coating apparatus for carrying out the coating method of the invention.

As shown in FIG. 4, the coating booth 80 defines a chamber therein and includes a first duct space 84 separated by an upper grid plate 82 or the like for supplying an air flow under pressure downwardly into the chamber in the coating booth 80. A grid plate 84 is also disposed in the bottom of the coating booth 80 and defines a second duct space 88 therebelow for collecting the air flow supplied from the first duct space 84 and discharging into an external processing device (not shown).

Figure 5:
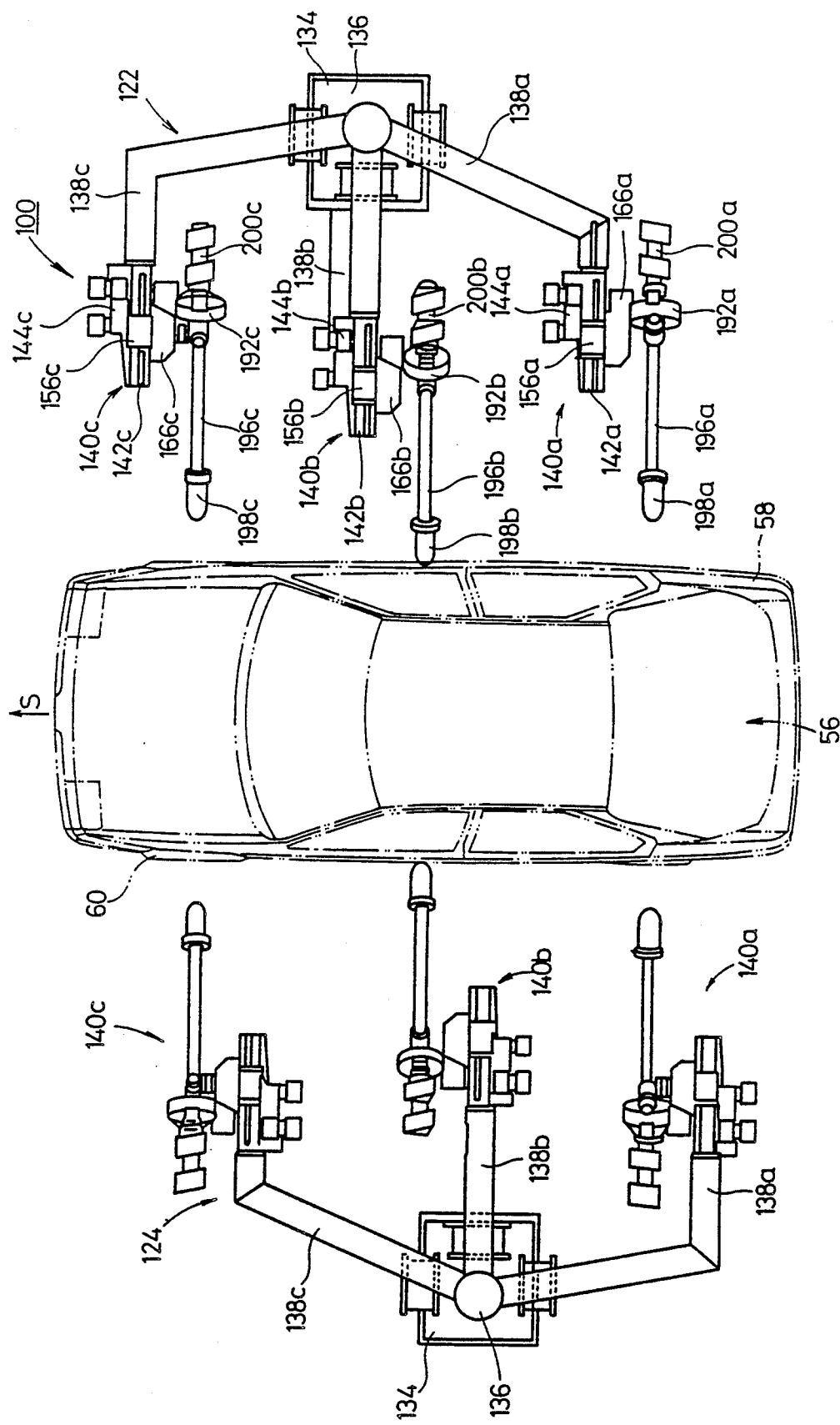
FIG. 5 is a plan view of the side coating apparatus shown in FIG. 4.

The first side coating apparatus 100 will be described below in detail. As shown in FIGS. 4 and 5, the first side coating apparatus 100 includes a righthand side coating mechanism 122 and a lefthand side coating mechanism 124.

The righthand side coating mechanism 122 has a base 134 on which a vertical post 136 is mounted. Three support rods 138a through 138c having different heights are fixed at their lower ends to the post 136. As shown in FIG. 5, the first support rod 138a which is in the lowest position extends rearwardly with respect to the automotive body 56 and is then directed in a direction normal to the direction (indicated by the arrow S) in which the automotive body 56 is delivered. The second support rod 138b which is in the highest position extends in a direction normal to the direction indicated by the arrow S. The second support rod 138c which is in the middle position extends forwardly with respect to the automotive body 56 and is then oriented perpendicularly to the direction indicated by the arrow S.

Figure 6:
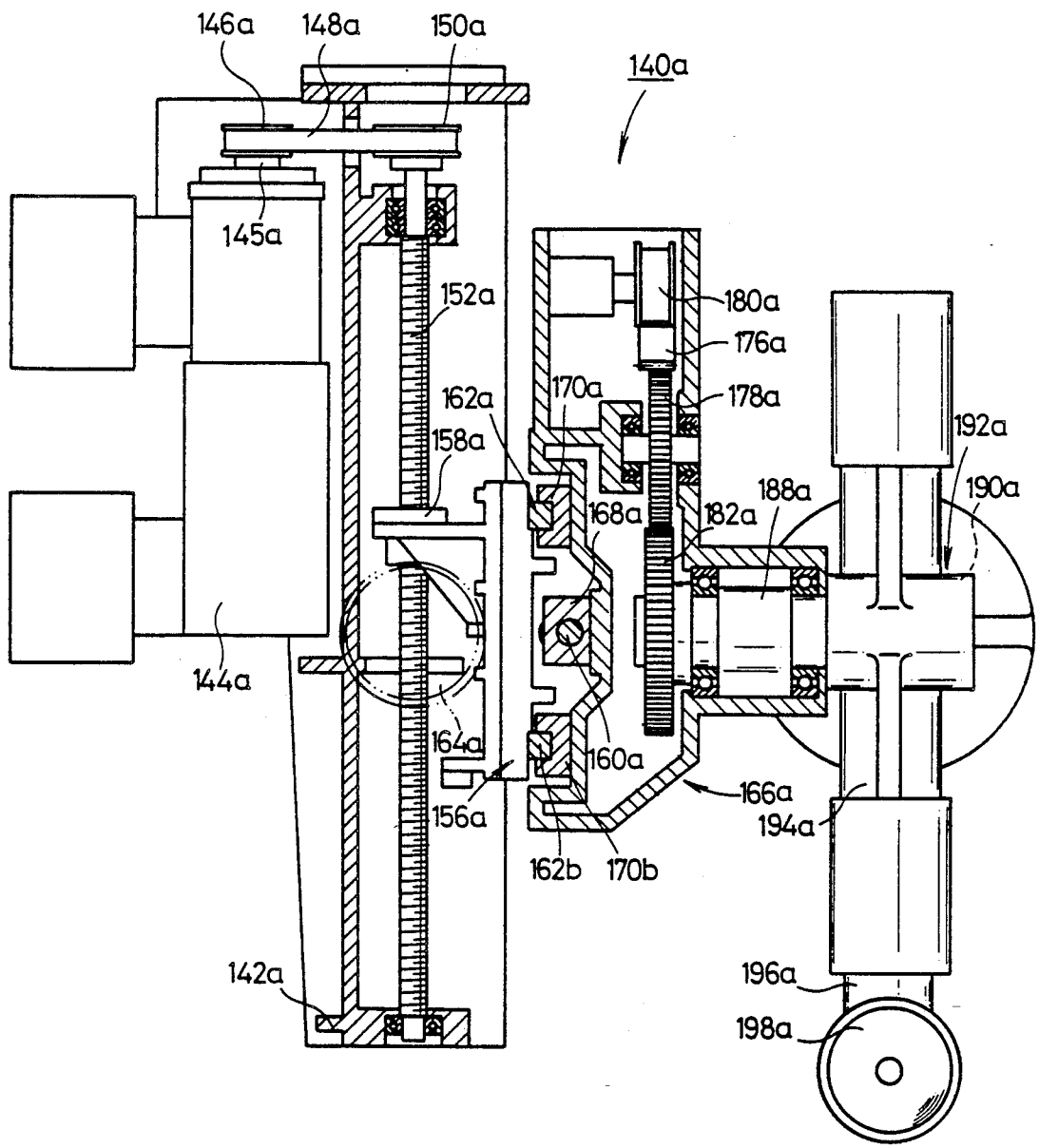
FIG. 6 is an enlarged transverse cross-sectional view of a coating means of each of the side coating apparatus.

First through third coating means 140a through 140c are displaceably mounted on the first through third support The first coating means 140a has a frame 142a fixed to the first rod 138a and extending perpendicularly to the direction in which the automotive body 56 is delivered, with a rotative drive source 144a fixedly mounted on an end of the frame 142a. As shown in FIG. 6, the rotative drive source 144a has a rotatable drive shaft 145a on which a pulley 146a is mounted. A belt 148a is trained around the pulley 146a and also a pulley 150a mounted on one end of a first ball screw 152a rotatably supported by the frame 142a. A pair of parallel guide rails 154a, 154b (FIG. 7) disposed one on each side of the ball screw 152a, and a slide base 156a is mounted on the guide rails 154a, 154b and the first ball screw 152a for movement back and forth in the direction normal to the direction indicated by the arrow S.

A nut 158a is mounted on one side of the slide base 156a with the first ball screw 152a threaded therethrough. Guide members (not shown) engaging the guide rails 154a, 154b are disposed one on each side of the nut 158a. A second ball screw 160a is rotatably supported on the other side of the slide base 156a and extends vertically, i.e., in a direction normal to the first ball screw 160a. A pair of parallel guide rails 162a, 162b are fixedly mounted on the slide base 156a one on each side of the second ball screw 160a. The second ball screw 160a is operatively coupled to a rotative drive source 164a fixed to an upper surface of the slide base 156a through a rotative power transmitting means (not shown) such as a bet and pulley.

Figure 8:
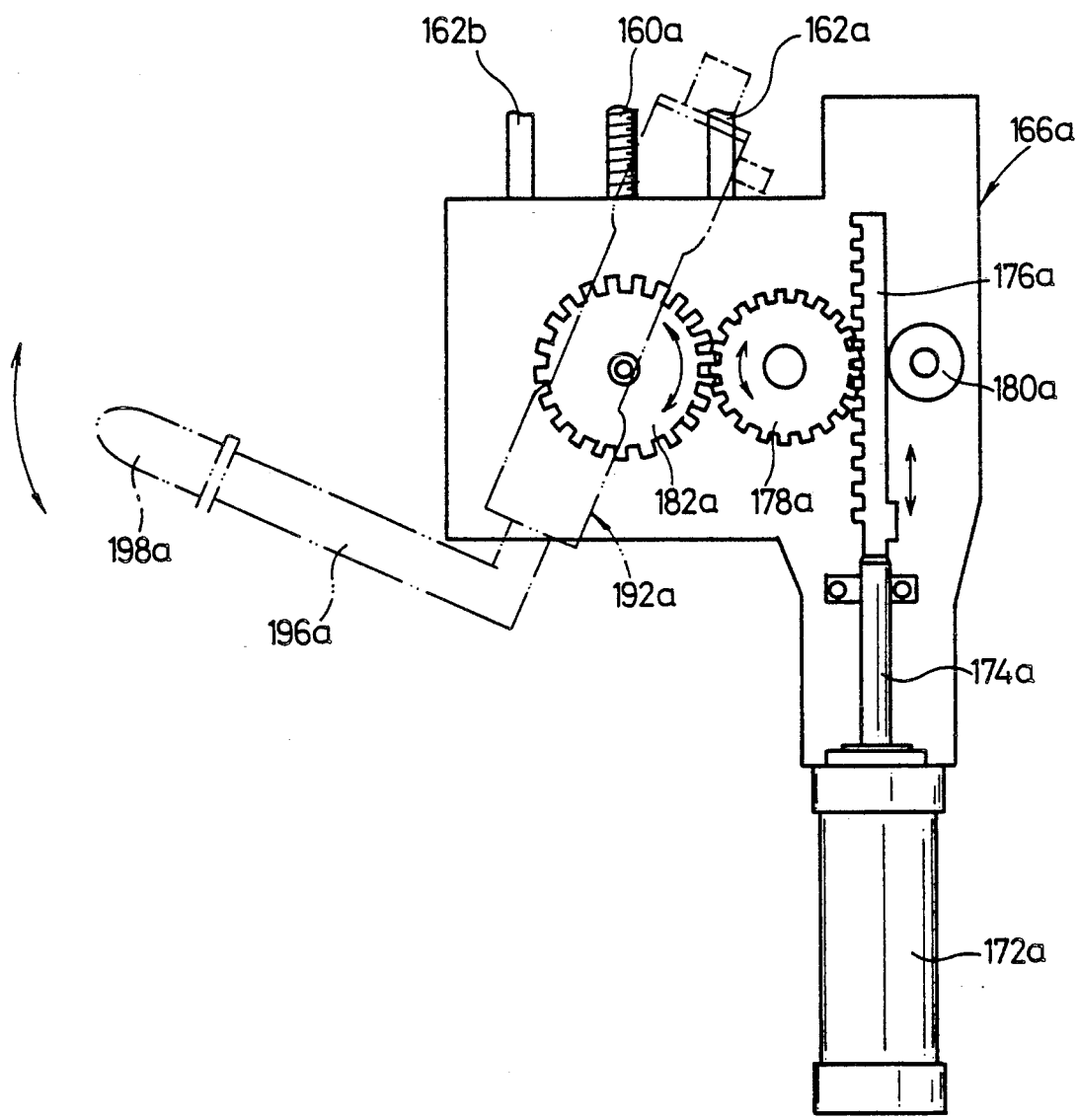

A unit body 166a is vertically movably mounted on the slide base 156a. A nut 168a through which the second ball screw 160a is threaded is attached to the unit body 166a, and guide members 170a, 170b are fixed to the unit body 166a one on each side of the nut 168a and engage the guide rails 162a, 162b, respectively. As shown in FIG. 8, a cylinder 172a is fixed to a lower end of the unit body 166a and has a piston rod 174a extending into the unit body 166a and coupled to a rack 176a. The rack 176a is in mesh with a pinion 178a. A roller 180a is mounted on the unit body 166a and held in rolling contact with a side of the rack 176a for holding the rack 176a in position The pinion 178a is held in mesh with a gear 182a mounted on one end of a rod 188a, the other end of which is supported in the unit body 166a and coupled coaxially to a rotor 190a (see FIG. 6). A bracket 192a is attached to the rotor 190a.

Figure 7:
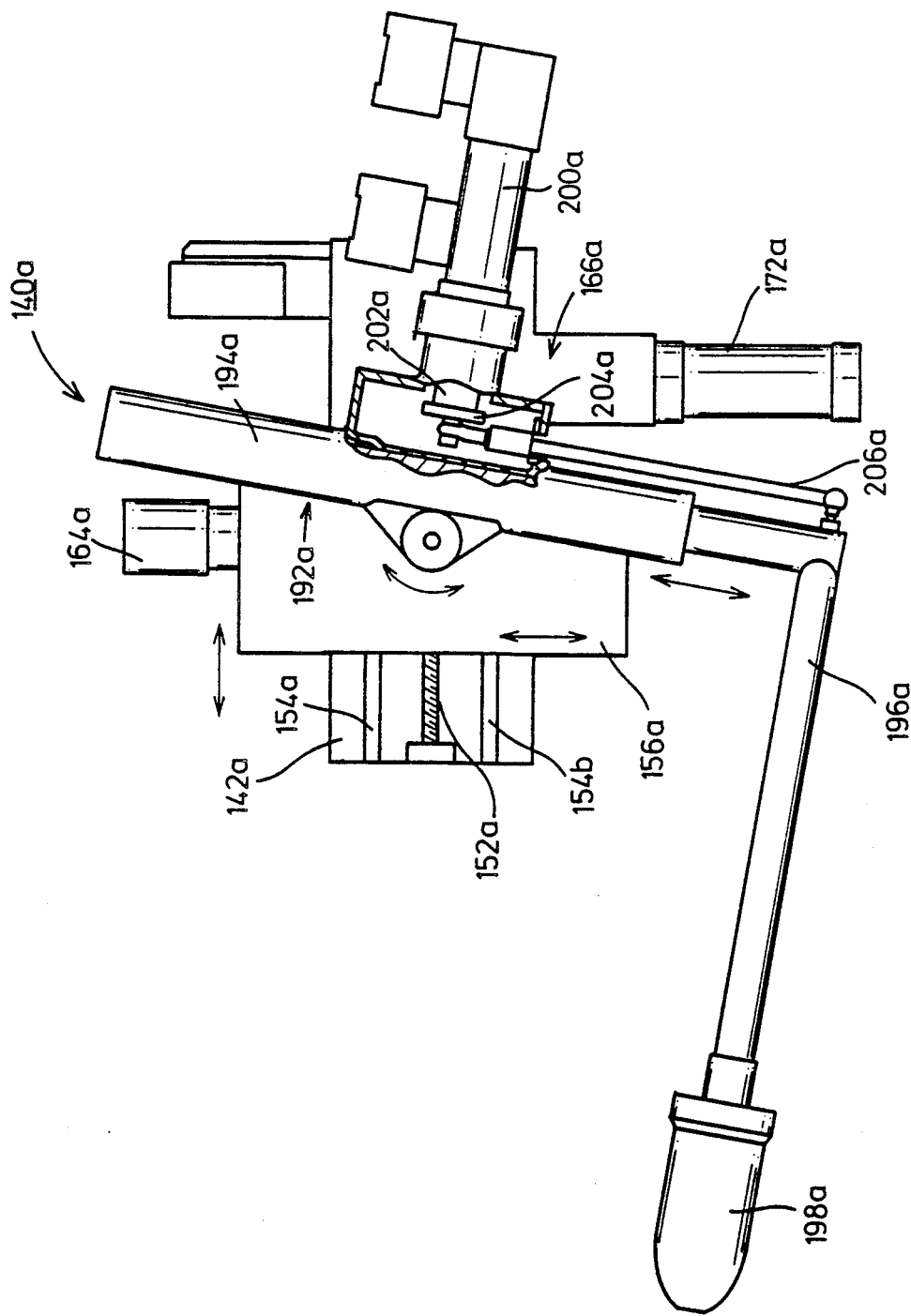
FIGS. 7 through 9 are views showing various components of the coating means shown in FIG. 6.
Figure 9:
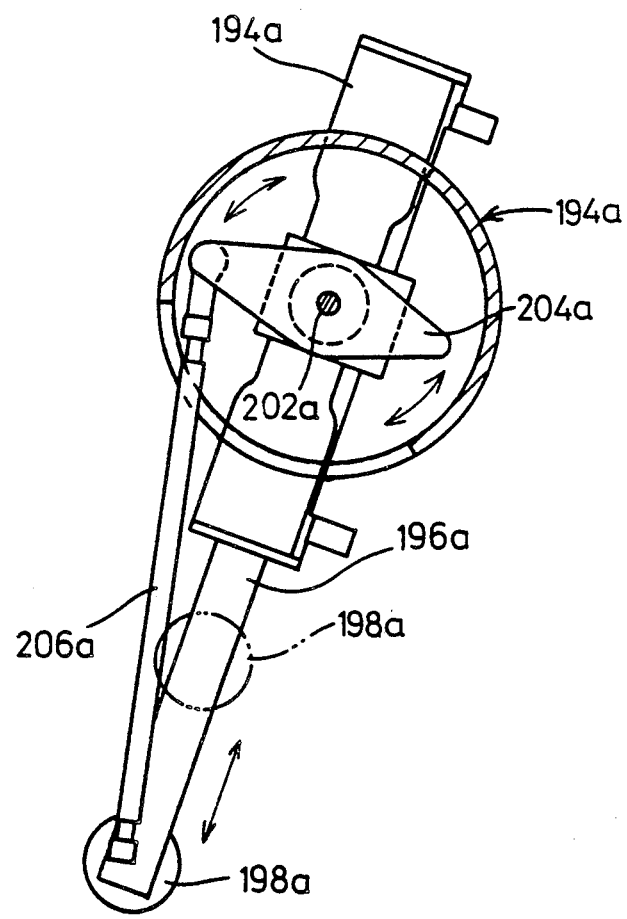

As illustrated in FIG. 7, the bracket 192a has a relatively long cylindrical member 194a in which one end of a substantially L-shaped arm 196a is slidably fitted. A paint spray gun 198a is mounted on the other outer exposed end of the arm 196a. A rotative drive source 200a is fixedly mounted on the bracket 192a and has an axis extending perpendicularly to the axis of the cylindrical member 194a. The rotative drive source 200a is coupled to a rotatable shaft 202a on which a substantially diamond shaped rotatable plate 204a (FIG. 9) is mounted. A rod 206a has one end connected to one outer end of the rotatable plate 204a and the other end connected to a bent portion of the arm 196a.

The first coating means 140a mounted on the first support rod 138a is constructed as described above. Each of the second and third coating means 140b, 140c mounted respectively on the second and third support rods 138b, 138c is identical in structure to the first coating means 140a. Those parts of the second and third coating means 140b, 140c which are identical to those of the first coating means 140a are denoted by identical reference numerals with suffixes b, c, respectively, and will not be described below in detail As shown in FIG. 4, the arm 196b of the second coating means 140b is of a complex bent configuration unlike the other arms 196a, 196c.

The lefthand side coating mechanism 124 is identical in construction to the righthand side coating mechanism 122. Those parts of the lefthand side coating mechanism 124 which are identical to those of the righthand side coating mechanism 122 are represented by identical reference numerals and will not be described in detail.

The upper coating apparatus 300 in the second station 52a has first and second upper coating mechanisms 310a, 310b which are displaceable back and forth along a rail 330 (FIG. 10) disposed parallel to the conveyor 54. The rail 330 has a rail bracket 332 extending from one end for the rail 330 to the other end thereof A rack 334 is disposed on a vertical outer side of the rail bracket 332 and extends longitudinally thereof.

The first and second upper coating mechanisms 310a, 310b have respective casings 336 placed on the rail bracket 332. The first upper coating mechanism 310a will be described below, with the second upper coating mechanism 310b being indicated at various parts thereof by identical reference numerals and not being described in detail. A plate 338 is fixed to the lower end of the casing 336, and a running motor 342 is attached to a side plate 340a secured to one side of the lower surface of the plate 338. The running motor 344 has a rotatable shaft 342a with a pinion 344 mounted on its distal end. The pinion 344 is held in mesh with the rack 334 on the rail bracket 332. Another side plate 340b is fixed to the other side of the lower surface of the plate 338. Wheels 346a, 346b are rotatably mounted on the side plates 340a, 340b, respectively, and held in rolling engagement with the rail bracket 332.

A vertical ball screw 348 is rotatably supported in the casing 336 and has an upper end coupled to the drive shaft of a vertically moving motor 350 mounted on the upper surface of the casing 336. Four guide rods 352a through 352d are vertically disposed parallel to each other and around the balls crew 348. A support plate 354 threaded over the ball screw 348 is thus vertically movable by the ball screw 348 which is rotated about its own axis by the vertically moving motor 350. The guide rods 352a through 352d extend through the support plate 354.

A turning motor 358 is fixedly mounted on the upper surface of the support plate 354 through a holder 356, and has a rotatable shaft 358a on which a gear 360 is mounted. The holder 356 holds a bearing 362 by which a turning shaft 364 is rotatably supported. The turning shaft 364 supports on one end thereof a gear 366 meshing with the gear 360. The other end of the turning shaft 364 projects out of the casing 336 and fixed to one end of a turning arm 368.

Figure 11:
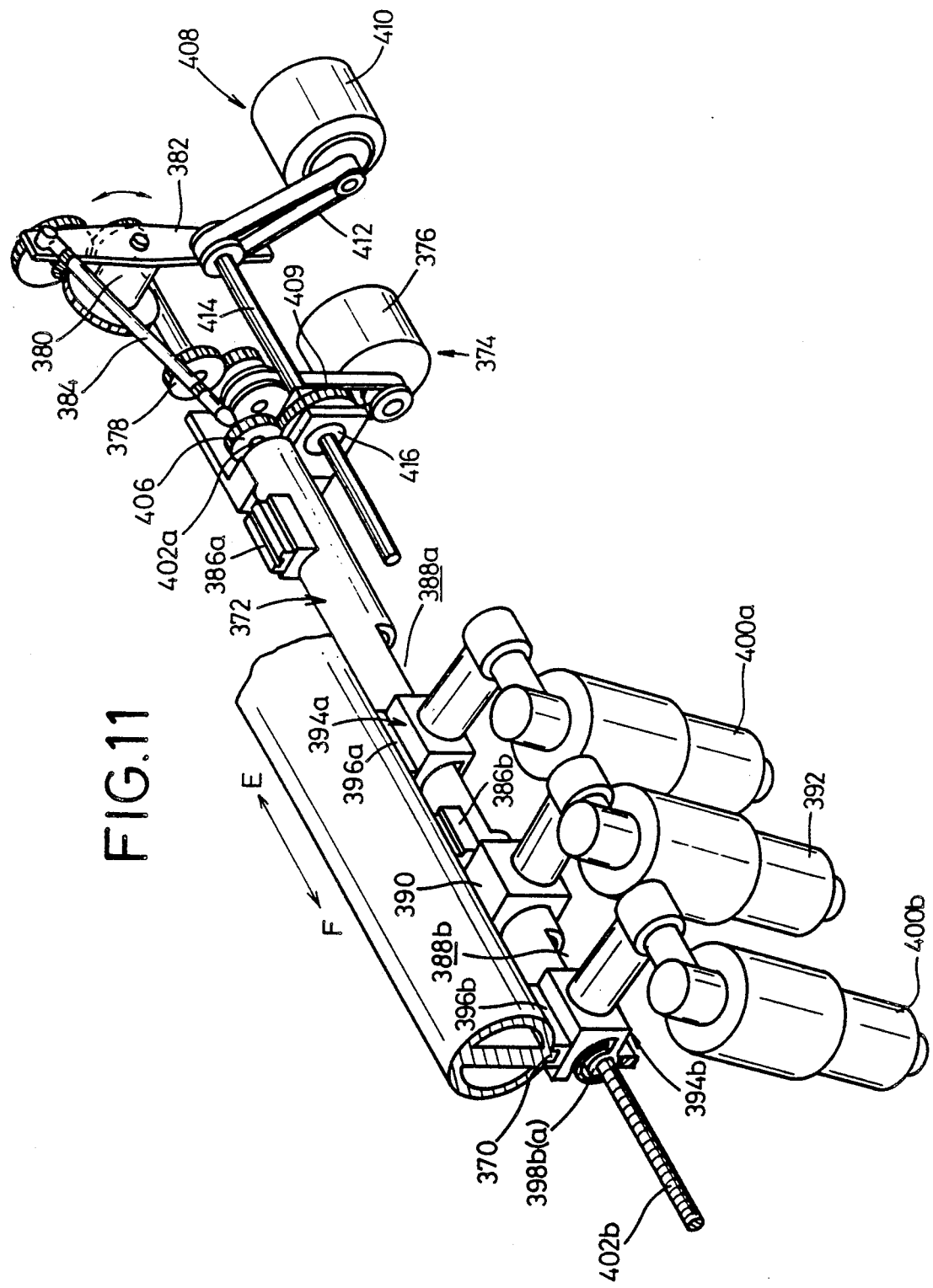
FIG. 11 is an enlarged fragmentary perspective view of the upper coating apparatus shown in FIG. 10.
Figure 12:
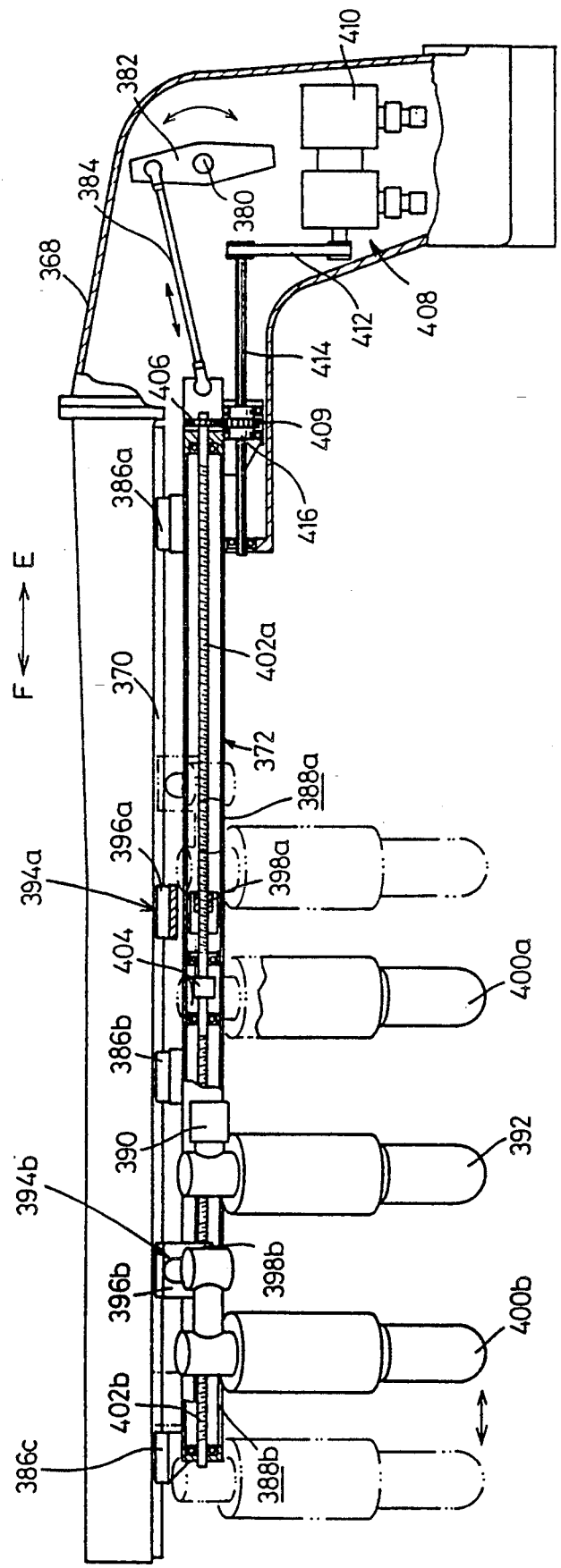
FIG. 12 is a front elevational view, partly in cross section, of the upper coating apparatus illustrated in FIG. 11.

The other end portion of the turning arm 368 extends transversely across the automotive body 56 (i.e., in the directions indicated by the arrows E, F). A guide rail 370 (FIGS. 11 and 12) is mounted on the other end portion of the turning arm 368, and a slide sleeve 372 is movably mounted on the guide rail 370 for movement back and forth in the directions indicated by the arrows E, F by means of a first actuator means 374. The first actuator means 374 includes a first rotative drive source 376 to which there is operatively coupled a rotatable shaft 380 through a rotative power transmitting means 378 comprising a belt and pulley and a gear train. A substantially diamond-shaped rotatable plate 382 is mounted at its center on the rotatable shaft 380, and has one outer end coupled to one end of a rod 384, the other end of which is coupled to an inner wall portion of the slide sleeve 372.

Guide members 386a through 386c engaging the guide rail 370 of the turning arm 368 are attached at spaced intervals to the outer periphery of the side sleeve 372. The slide sleeve 372 is suspended from the guide rail 370 by these guide members 386a through 386c. The side sleeve 372 has recesses 388a, 388b defined in its outer periphery between the guide members 386a, 386b and between the guide members 386b, 386c, respectively. An attachment 390 is fixed to the slide sleeve 372 in the vicinity of the guide member 386b, and a paint spray gun 392 is mounted on the attachment 390. Gun supports 394a, 394b are disposed respectively in the recesses 388a, 388b.

The gun supports 394a, 394b have respective guides 396a, 396b engaging the guide rail 370, and respective nuts 398a, 398b extending into the slide sleeve 372 through the recesses 388a, 388b and disposed coaxially with the slide sleeve 372, the nuts 398a, 398b being threaded over a ball screw (described later). Paint spray guns 400a, 400b which are in the same angular position as that of the paint spray guns 392 are mounted on the gun supports 394a, 394b, respectively.

A first ball screw 402a having a righthanded screw thread is rotatably supported in the slide sleeve 372 near the paint spray gun 400a, and a second ball screw 402b having a lefthanded screw thread is rotatably supported in the slide sleeve 372 near the paint spray gun 400b. The first and second ball screws 402a, 402b are threaded respectively in the nuts 398a, 398b, and have ends coaxially joined firmly to each other by means of a coupling 404. A gear 406 is mounted on the other end of the first ball screw 402a and held in mesh with a gear 409 of a second actuator means 408, the gear 409 being supported on the slide sleeve 372.

The second actuator means 408 includes a rotative drive source 410 fixed to the turning arm 368. The rotative drive source 410 is operatively coupled to one end of a splined shaft 414 through a rotative power transmitting means 412 comprising a belt and pulley. The splined shaft 414 extends parallel to the slide sleeve 372 and has opposite ends rotatably supported in the turning arm 368. The splined shaft 414 is fitted in a rotor 416 supported on the slide sleeve 372, with the gear 409 being rotatably mounted on the rotor 416.

Figure 13:
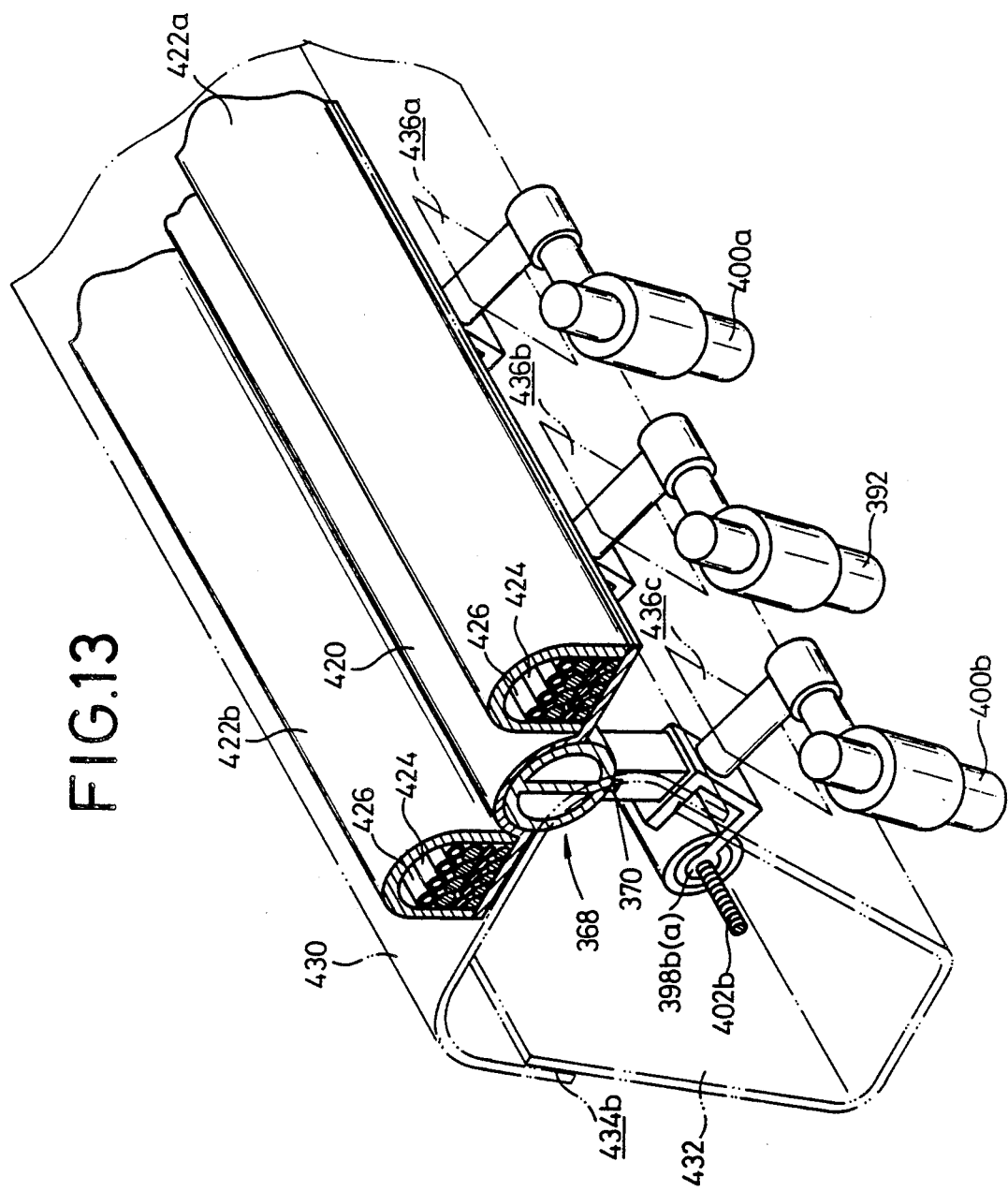
FIG. 13 is a perspective view showing the relationship between a cover and a coating mechanism of the upper coating apparatus.

As shown in FIG. 13 a support 420 having a central curved portion and flat opposite ends is disposed in an upper portion of the cylindrical turning arm 368. A pair of casings 422a, 422b each having a shell-shaped cross section is held on the flat opposite ends, respectively, of the support 420. The casings 422a, 422b house therein pipes 424 for supplying paint to the paint spray guns 392, 400a, 400b and pipes 426 for supplying air under pressure thereto, the pipes 424, 446 extending longitudinally in the casings 422a, 422b. The support 420, the casings 422a, 422b, the ball screws 402a, 402b, etc., are surrounded by a first cover 430 having a curved upper portion and a second cover 432.

Figure 14:
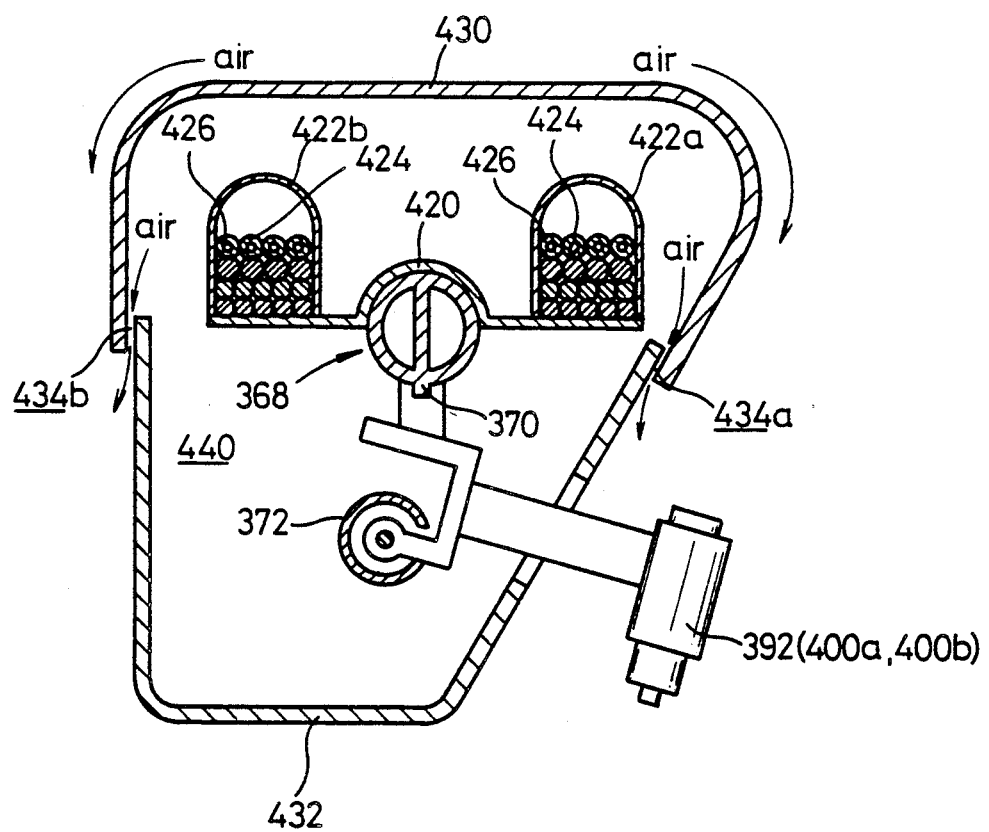
FIG. 14 is a vertical cross-sectional view showing the relationship between the cover and the coating mechanism shown in FIG. 13.

As shown in FIG. 14, the second cover 432 is partly disposed in the first cover 430, with spaces or gaps 434a, 434b defined between downwardly extending ends of the first cover 430 and upwardly extending ends of the second cover 432. The second cover 432 has openings 436a, 436b, 436c, desired in a side wall thereof with the paint spray guns 392, 400a, 400b being exposed out through these openings 436a, 436b, 436c.

The first cover 430 and the second cover 432 are retained on the turning arm 368 by respective suitable means (not shown). The pipes 426 for supplying air under pressure have ends exposed out of the casings 422a, 422b and in a space 440 defined in and between the first and second covers 430, 432. The pipes 424 for supplying paint and the pipes 426 for supplying compressed air are bundled together and placed in a flexible member 460 extending into the casing 336 and are connected to a paint supply source and a compressed air supply source (not shown).

The second side coating mechanism 100a in the third station 52c is structurally identical to the first side mechanism 100. Those parts of the second side coating mechanism 100a which are identical to those of the first side coating mechanism 100 are denoted by identical reference numerals, and will not be described in detail.

The coating apparatus for carrying out a coating method of the present invention is constructed as described above. Operation and advantages of the coating apparatus will be described below.

In the first station 52a, the paint spray guns 198a through 198c of the first side coating mechanism 100 are positioned in a pattern corresponding to the shapes of the righthand and lefthand side panels 58, 60 of the automotive body 56. The first coating means 140a will be described first. The rotative drive source 144a fixed to the frame 142a is energized to cause the pulley 146a, the belt 148a, and the pulley 150a to rotate the first ball screw 152a. The slide base 156a with its nut 158a threaded over the first ball screw 152a is now displaced horizontally whie being guided by the guide rails 154a, 14b, thereby to adjust the distance or gap between the paint spray gun 198a and the righthand side panel 58 of the automotive body 56.

Then, the rotative drive source 164a mounted on the slide base 156a is energized to cause the rotative power transmitting means (not shown) to rotate the second ball screw 160a about its own axis in a desired direction. The unit body 166a with its nut 168a threaded over the second ball screw 160a is vertically displaced while being guided by the guide rails 162a, 162b and the guide members 170a, 170b to determine a vertical height for the paint spray gun 198a.

The cylinder 172a on the unit body 166a is then operated to displace the piston rod 174a vertically. The rack 176a coupled to the piston rod 174a is displaced to rotate the pinion 178a meshing with the rack 176a. The gear 182a meshing with the pinion 178a is rotated through a certain angle to enable the rod 188a and the rotor 190a to turn the bracket 192a. The paint spray gun 198a mounted on the end of the arm 196a fitted in the bracket 192a is now oriented substantially perpendicularly to a lower portion of the righthand side panel 58 of the automotive body 56 (see FIG. 4).

The paint spray guns 198b, 198c of the second and third coating means 140b, 140c are similarly spaced from and directed substantially perpendicularly to upper and middle portions, respectively, of the righthand side panel 58 of the automotive body 56. In the lefthand side coating mechanism 124, the paint spray guns 198a through 198c are also spaced from and directed substantially perpendicularly to lower, upper, and middle portions of the lefthand side panel 60 of the automotive body 56.

After the first side coating apparatus 100 has been prepared for coating operation, the automotive body 56 is delivered into the first station 52a by the conveyor 54, and the first coating means 140a of the righthand and lefthand side coating mechanisms 122, 124 are positioned in confronting relation to front end portions of the righthand and lefthand side panels 58, 60 of the automotive body 56.

The rotative drive source 200a of the first coating means 140a is actuated to rotate the shaft 202a which then rotates the rotatable plate 204a. The end of the rod 206a which is connected to the projecting outer end of the rotatable plate 204a is displaced along a circular path, and the arm 196a coupled to the other end of the rod 206a is slidably displaced in the cylindrical member 194a. As a result, the paint spray gun 198a mounted on the arm 196a is reciprocally moved substantially parallel with respect to the surface of the lower portion of the righthand side panel 58 (see the arrow in FIG. 4). Therefore, a paint spray ejected from the paint spray gun 198a is applied to coat the lower portion of the righthand side panel 58.

The lower portion of the lefthand side panel 60 of the automotive body 56 is similarly coated by the first coating means 140a of the lefthand side coating mechanism 124.

When the automotive body 56 is further delivered in the direction of the arrow S by the conveyor 54, the second and third coating means 140b, 140c confront the side panels of the automotive body 56. The paint spray guns 198b, 198c are reciprocally moved in directions substantially parallel to the corresponding surfaces of the upper and middle portions of the righthand and lefthand side panels 58, 60, whie at the same time the paint spray guns 198b, 198c eject paint sprays to these surfaces. Therefore, when the automotive body 56 has passed between the righthand and lefthand side coating mechanisms 122, 124, the righthand and lefthand side panels 58, 60 are entirely coated with paint sprays.

In the above embodiment, the paint spray guns 198a through 198c of the first through third spray guns 140a through 140c are oriented substantially perpendicularly to, and spaced certain distances from, the surfaces of the righthand and lefthand side panels 58, 60 of the automotive body 56. The paint spray guns 198a through 198c apply paint sprays to these surfaces while being reciprocally moved substantially parallel to the surfaces. Therefore, the amounts of paint applied to the righthand and lefthand side panels 58, 60 are the same and the applied paint coatings on these side panels 68, 60 are equal in thickness to each other. Therefore, the righthand and lefthand side panels 58, 60 are coated with paint layers of a uniform thickness.

The first through third coating means 140a through 140c are spaced at certain intervals in the direction (indicated by the arrow S) in which the automotive body 56 is delivered, and the paint spray guns 198a through 198c of these coating means 140a through 140c are positioned at respective different heights. Consequently, each of the paint spray guns 198a through 198c is only required to move in a vertical range which is about one-third of the height of the righthand and lefthand side panels 58, 60. As a result, as compared with a coating apparatus in which the single paint spray gun 198a would be moved progressively upwardly from the lower to upper ends of the righthand side panel 58 while applying a paint spray, the automotive body 56 can be delivered at a higher speed in the direction of the arrow S, so that the entire coating process can be finished within a shorter period of time.

Inasmuch as the paint spray guns 198a through 198c are spaced at intervals in the direction of feed of the automotive body 56, when the automotive body 56 is electrostatically coated, particles of the paint sprays ejected from the paint spray guns 198a through 198c are not repelled from each other. The righthand and lefthand side panels 58, 60 of the automotive body 56 can thus be coated highly accurately As described above, the paint spray gun 198a of the first coating means 140a is horizontally and vertically displaceable by the rotative drive sources 144a, 164a, and is also angularly adjustable by the cylinder 172a. Likewise, the other paint spray guns 198b, 198c are also horizontally and vertically movable and tiltable. Thus, an automotive body of a different type can easily be coated simply by positionally adjusting the paint spray guns 198a through 198c to the shape of the automotive body. Therefore, the first side coating mechanism 100 is versatile in that it can coat automotive bodies of many shapes or types in small quantities.

An automotive body 56 which has a highly complex shape may also be coated highly accurately by independently displacing the paint spray guns 198a through 198c during the coating operation.

Thereafter, the automotive body 56 is fed into the second station by the conveyor 54. In the second station 56, the paint spray guns 392, 400a, 400b of the first and second upper coating mechanisms 310a, 310b have already been positioned so as to be oriented toward a front surface of the engine hood 62 of the automotive body 56.

Figure 15A:
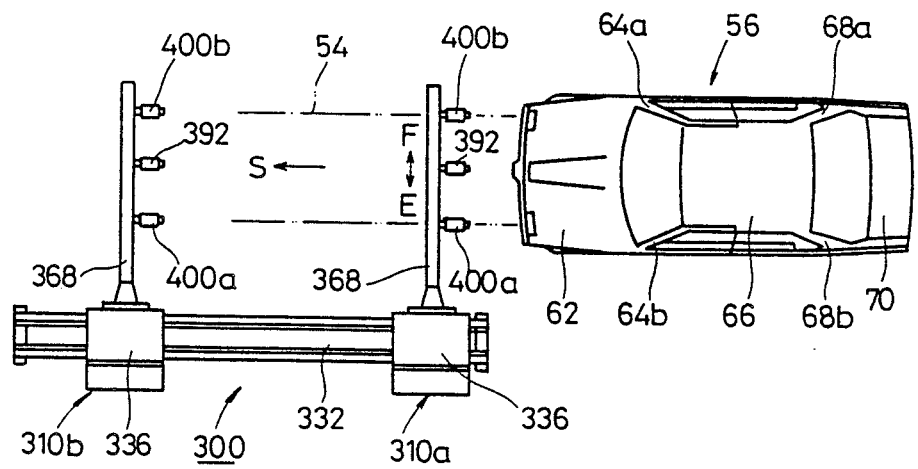
FIGS. 15(a) through 15(c) are schematic plan views illustrative of the coating method effected by the upper coating apparatus.

When the front surface of the engine hood 62 reaches a position spaced a certain distance from the paint spray guns 392, 400a, 400b of the first upper coating mechanism 310a, paint sprays are ejected from the paint spray guns 392, 400a, 400b toward the front surface of the engine hood 62, while at the same time the paint spray guns 392, 400a, 400b are angularly moved or swung (see FIG. 15(a)).

More specifically, when the rotatable shaft 380 is rotated by the rotative drive source 376 through the rotative power transmitting means 378, the rotatable plate 382 mounted on the shaft 380 is rotated. The end of the rod 384 coupled to the outer end of the rotatable plate 382 is now displaced along a circular path. The slide sleeve 372 engaging the other end of the rod 284 is then reciprocally moved transversely of the automotive body, i.e., in the directions indicated by the arrows E, F whie being guided by the horizontal guide rail 370 and the guide members 386a, 386c. The front surface of the engine hood 62 is coated by the paint spray guns 392, 400a, 400b.

The vertically moving motor 350 is energized to rotate the ball screw 348 about its own axis. The turning arm 368 is then lifted in the direction of the arrow D by the support plate 354 threaded over the ba screw 348. The upward movement of the turning arm 368 also lifts the paint spray guns 392, 400a, 400b along the front surface of the engine hood 62 as the paint spray guns 392, 400a, 400b swing in the directions indicated by the arrows E, F.

The running motor 342 is energized to rotate the pinion 344 mounted on the shaft 342a thereof. The casing 336 is moved along the rail bracket 332 at a certain speed in the direction of the arrow S in FIG. 15(a) by the rack 334 meshing with the pinion 344. The front surface of the engine hood 62 of the automotive body 56 fed in the direction of the arrow S by the conveyor 54 is now coated by the paint spray guns 392, 400a, 400b which remain spaced from the front surface of the engine hood 62.

After the front surface of the engine hood 62 has been coated, the running motor 342 is de-energized, or slowed down to a predetermined speed, and the turning motor 358 is energized. The turning arm 368 is now angularly moved about the shaft 364 in the direction indicated by the arrow B through the gear 366 meshing with the gear 360 supported on the shaft 358a of the turning motor 358. As a result, the paint spray guns 392, 400a, 400b mounted on the turning arm 368 are directed perpendicularly to the engine hood 62 of the automotive body 56. With the automotive body 56 being fed at a given speed in the direction of the arrow S by the conveyor 54, the engine hood 62 is coated with a paint coat by the paint spray guns 392, 400a, 400b.

After the engine hood 62 has been coated, the vertically moving motor 350 is energized to displace the turning arm 368 in the direction of the arrow D, and the paint spray guns 400a, 400b are displaced toward the respective front pillars 64a, 64b. More specifically, the rotative drive source 41 of the second actuator means 408 is actuated to cause the rotative power transmitting means 412 to rotate the splined shaft 414 about its own axis in a certain direction. The rotor 416 in which the splined shaft 414 is fitted is then rotated to cause the gear 409 coupled to the rotor 416 and the gear 406 meshing with the gear 409 to the first ball screw 402a about its own axis. The rotation of the first ball screw 402a moves the nut 398a threaded thereover to move the gun support 394a toward the paint spray gun 392 while being guided by the guide 396a and the guide rail 370.

The second ball screw 402b which is externally threaded in the direction opposite to the direction in which the first ball screw 402a is externally threaded is coupled coaxially to the first ball screw 402a through the coupling 404. Therefore, upon rotation of the first ball screw 402a, the second ball screw 402b is also rotated to cause the nut 398b threaded thereover to displace the gun support 394b toward the paint spray gun 392.

The turning motor 358 is energized to rotate the turning arm 368 through a certain angle to direct the paint spray guns 400a, 400b substantially perpendicularly to the front pillars 64a, 64b.

The paint spray guns 400a, 400b are thus displaced along the slanted surfaces of the front pillars 64a, 64b to coat them reliably. At this time, the ejection of a paint spray from the paint spray gun 392 may be stopped, and the amount of paint sprayed from the paint spray guns 400a, 400b may be reduced to reduce any unwanted consumption of paint.

Figure 15B:
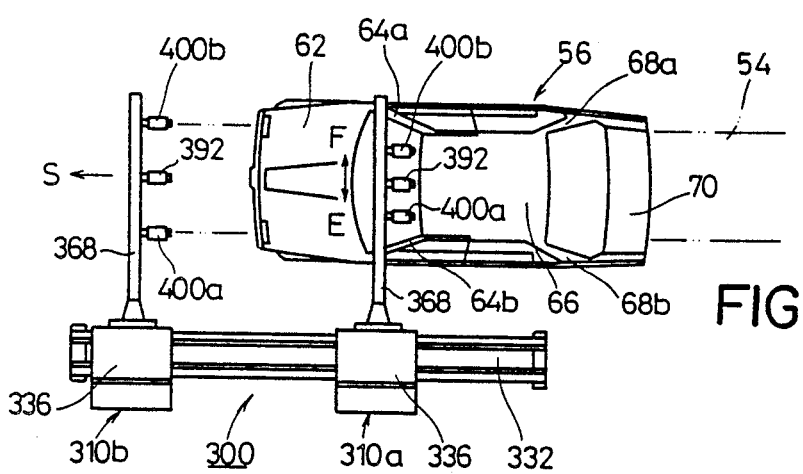

As shown in FIG. 15(b), when the paint spray guns 392, 400a, 400b reach the front end of the roof 66 of the automotive body 56, the turning motor 358 is energized to direct the paint spray guns 392, 400a, 400b substantially perpendicularly to the roof 66, and paint sprays are ejected from the paint spray guns 392, 400a, 400b toward the roof 66. At this time, as when the engine hood 62 is coated, paint sprays are ejected from the paint spray guns 392, 400a, 400b which are moved in the directions of the arrows E, F by the first actuator means 374 with respect to the automotive body 56 which is being delivered in the direction of the arrow S by the conveyor 54, thus coating the roof 66.

Then, when the paint spray guns 392, 400a, 400b reach the boundaries between the roof 66 and the rear pillars 68a, 68b, the ejection of paint from the paint spray gun 392 is inactivated, and the amount of paint ejected from the paint spray guns 400a, 400(b) is reduced. The rear pillars 68a, 68b are coated in a manner which is the reversal of the aforesaid process of coating the front pilars 64a, 64b More specifically, the rear pillars 68a, 68b are inclined downwardly and transversely outwardly with respect to the trunk lid 70. The turning motor 358 is energized to turn the turning arm 368 to direct the paint spray guns 400a, 400b substantially perpendicularly to the rear pillars 68a, 68b. At the same time, the second actuator means 408 is operated to rotate the first and second ball screws 402a, 402b in the opposite direction to displace the paint spray guns 400a, 400b away from the paint spray gun 392 (as indicated by the two-dot-and-dash lines in FIG. 12). The vertically moving motor 350 is also energized to displace the turning arm 368 in the direction indicated by the arrow A.

Figure 15C:
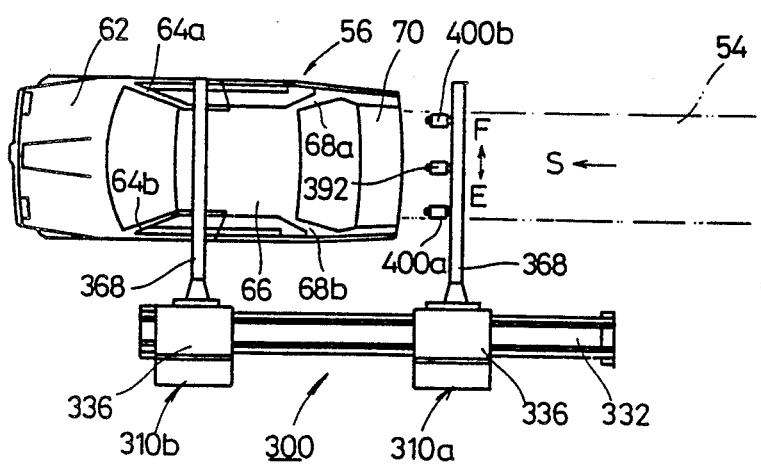

After the rear pillars 68a, 68b have been coated, then the trunk lid 70 is coated. More specifically, the paint spray guns 392, 400a, 400b are directed substantially perpendicularly to the trunk lid 70 and apply a paint coating to the trunk lid 70. Then, the paint spray guns 392, 400a, 400b are turned so as to be horizontally oriented, and apply paint sprays to a lower portion of the trunk lid 70 (see FIG. 15(c)). At this time, the running motor 342 is energized to move the casing 336 at a certain speed in the direction of the arrow S to keep the paint spray guns 392, 400a, 400b spaced a constant distance from the lower portion of the trunk lid 70.

In this manner, the outer surfaces of the engine hood 62, the front pillars 64a, 64b, the roof 66, the rear pillars 68a, 68b, and the trunk lid 70 of the automotive body 56 are fully coated.

According to the above embodiment, since the automotive body 56 is coated while varying the distances between the paint spray guns 400a, 392 and between the paint spray guns 400b, 392, the surfaces of the automotive body 56 can accurately be coated with paint sprays ejected from these paint spray guns, without an undesirable excessive consumption of paint.

More specifically, the roof 66 has a transverse width which is generally smaller than the width of the engine hood 62 or the trunk lid 70. If the roof 66 were coated by the paint spray guns 392, 400a, 400b which are positioned to match the width of the engine hood 62, a considerable amount of paint would be ejected from the paint spray guns 400a, 400b toward areas beyond the roof 66.

According to the upper coating apparatus 300 of the present invention, however, the first actuator means 376 is operated to enable the slide sleeve 273 to move the paint spray guns 392, 400a, 400b reciprocally in the directions of the arrows E, F, and the second actuator means 408 is operated to displace the paint spray guns 400a, 400b toward or away from each other. Therefore, the paint spray guns 392, 400a, 400b are first positioned to cover the shape of the engine hood 62, and after the engine hood 62 has been coated and before the front pillars 64a, 64b are coated, the second actuator means 408 is operated to displace the paint spray guns 400a, 400b toward each other to reduce the distances between the paint spray guns 400a, 392 and between the paint spray guns 400b, 392. Thereafter, when the roof 66 is coated, the paint spray guns 400a, 400b are not displaced greatly outwardly transversely of the roof 66, and hence any unnecessary consumption of paint is greatly prevented. As a result, the amount of paint used in the coating process is reduced to a large extent, resulting in an economical coating operation.

Since the paint spray guns 400a, 400b are movable transversely with respect to the automotive body 56, even if the automotive body 56 is of a complex shape, the distance between the paint spray guns 400a, 400b may be adjusted to allow them to eject paint sprays precisely toward the surfaces of the automotive body 56. The automotive body 56 can be coated highly accurately without a coating failure.

Figure 10:
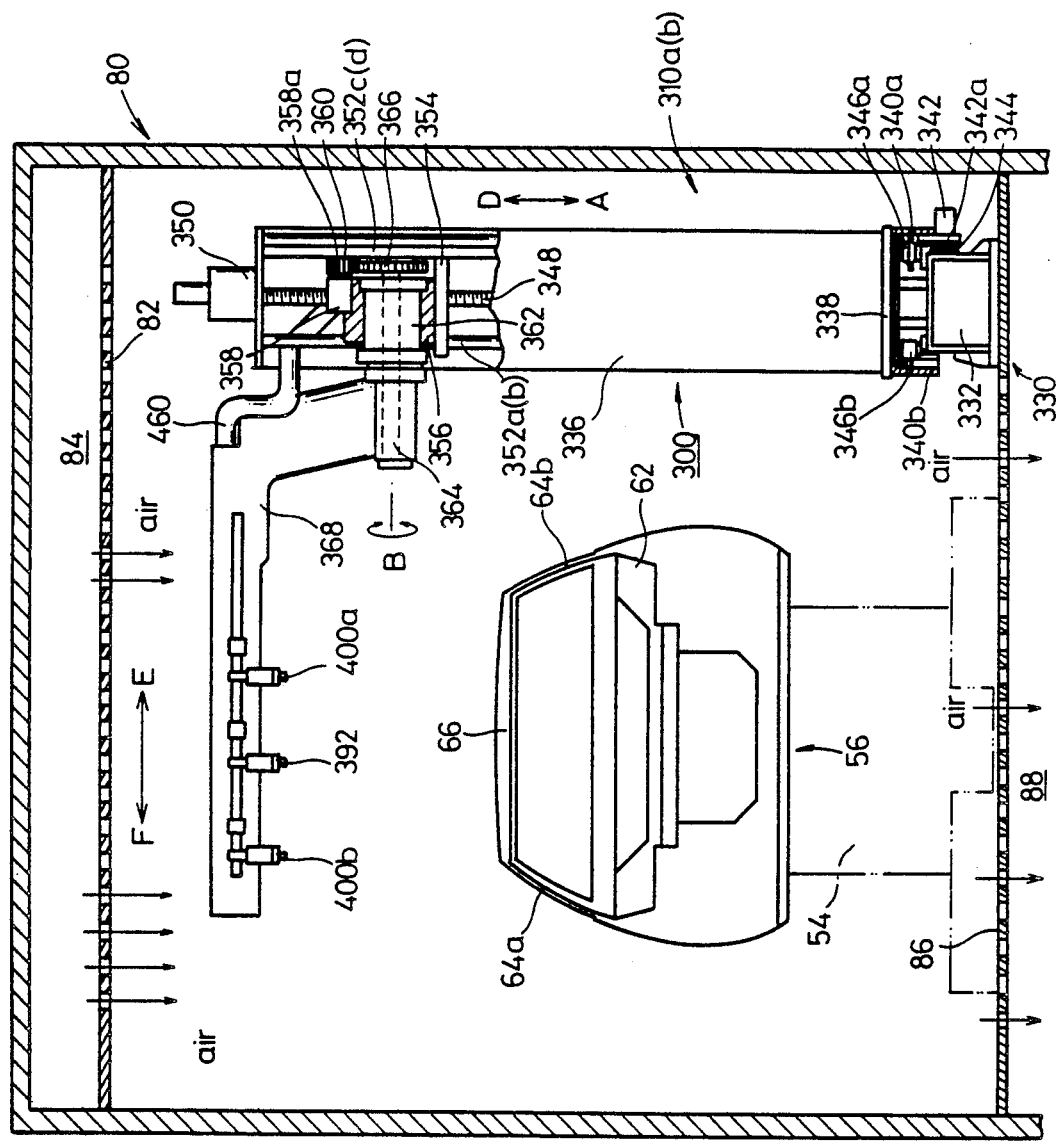
FIG. 10 is a side elevational view, partly in cross section, of an upper coating apparatus for carrying out the coating method of the invention.

With the aforesaid embodiment, while the automotive body 56 is being coated by the paint spray guns 392, 400a, 400b of the upper coating mechanism 300, air flows are directed from within the duct space 84 into the coating booth 80 as indicated by the arrows in FIG. 10 and toward the second duct space 88. In the coating booth 88, the air flows from the duct space 84 encounter the upper surface of the first cover 430. Because the upper surface of the first cover 430 is curved, the air flows are smoothly directed downwardly along the curved surface as indicated by the arrows. The first and second covers 430, 432 define the small gaps 434a, 434b therebetween, and the open end of the air supply pipe 426 is positioned in the space 440 in the first and second covers 430, 432. Air ejected from the pipe 426 is caused to flow through the space 440 and then through the small gaps 434a, 434b downwardly out of the covers 430, 432. Air flowing out of the gaps 434a, 434b permits paint sprays ejected from the tips of the paint spray guns 392, 400a, 400b to be applied to the surfaces of the automotive body 56 without disturbing the ejected paint sprays.

While the automotive body 56 is being coated by the first upper coating mechanism 310a, it is also coated by the second upper coating mechanism 310b. The engine hood 62, the front pillars 64a, 64b, the roof 66, the rear pillars 68a, 68b, and the trunk lid 70 are thus coated with two paint layers, so that the automotive body 56 will be coated highly accurately with high coating quality.

Thereafter, the automotive body 56 is delivered by the conveyor 54 into the third station 52c in which a second paint layer is applied to the righthand and lefthand side panels 58, 60. All the outer surfaces of the automotive body 56 are fully coated in this manner.

An upper coating apparatus according to a second embodiment of the present invention will be described below. Those parts of the upper coating apparatus of the second embodiment which are identical to those of the upper coating apparatus 300 of the first embodiment are represented by identical reference numerals, and will not be described in detail.

Figure 16:
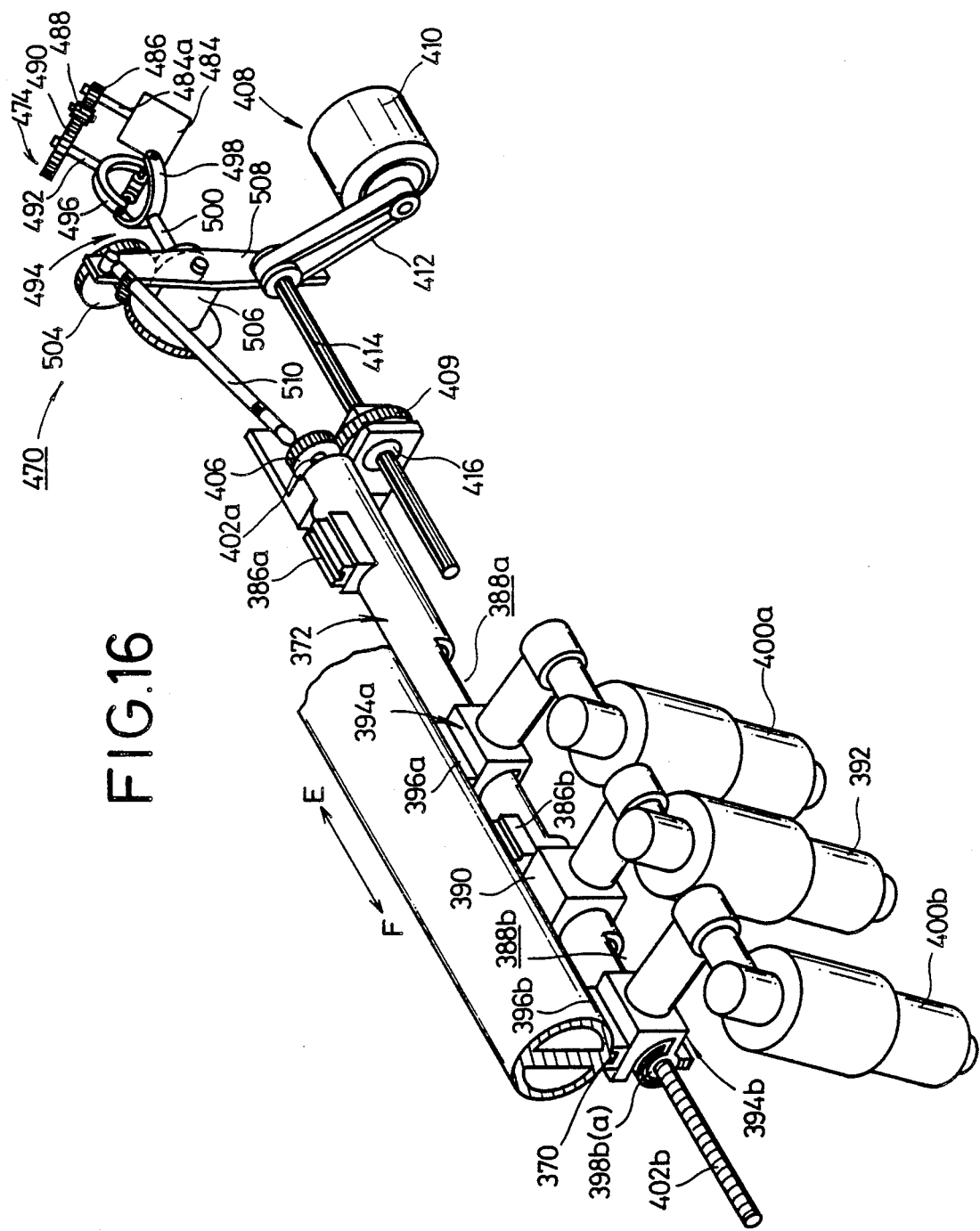
FIG. 16 is an enlarged fragmentary perspective view of an upper coating apparatus according to a second embodiment of the present invention.
Figure 17:
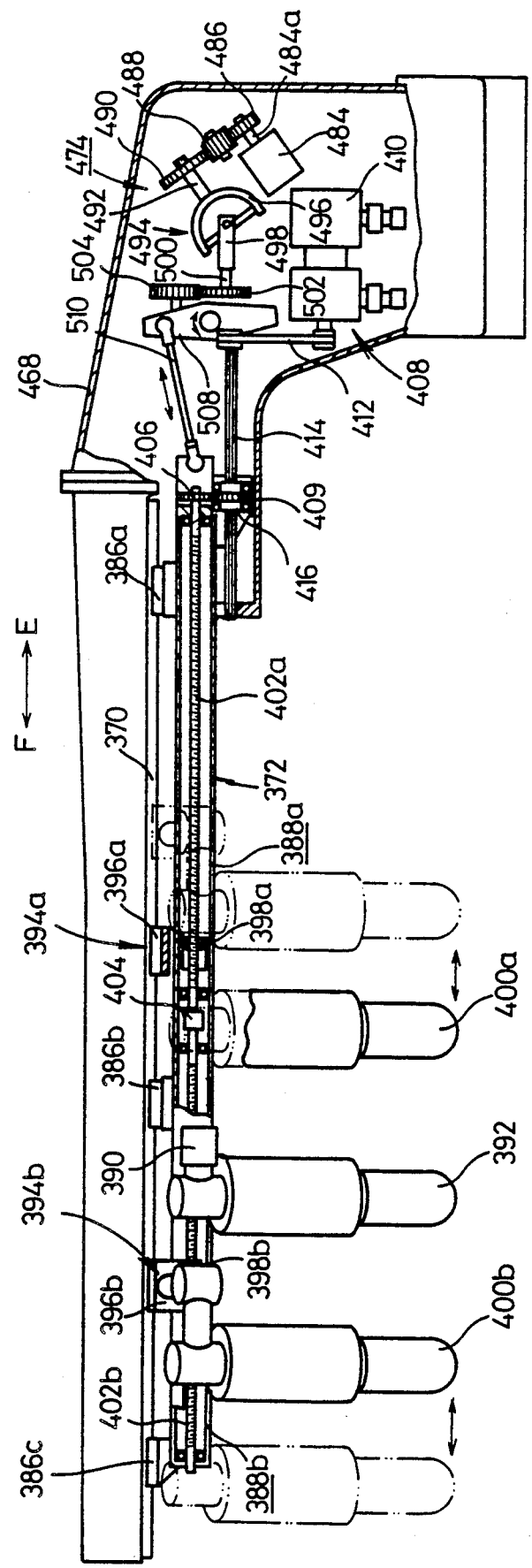
FIG. 17 is a front elevational view, partly in cross section, of the upper coating apparatus shown in FIG. 16.
Figure 18:
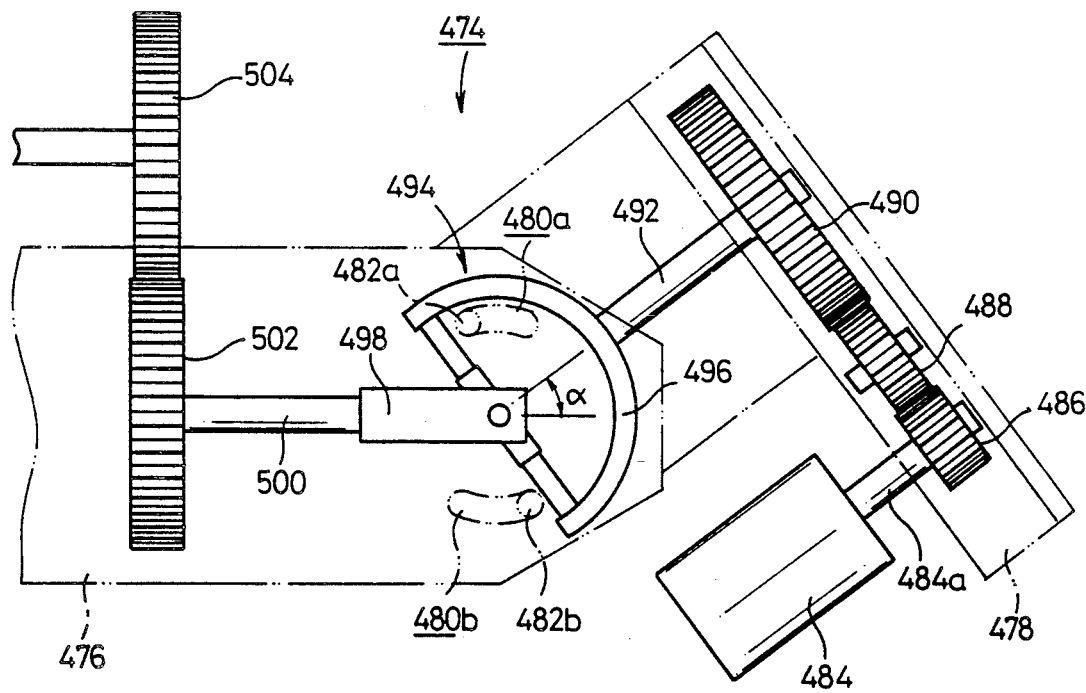
FIG. 18 is an enlarged view of an actuator mechanism in the upper coating apparatus shown in FIG. 16.

As shown in FIGS. 16 through 18, the upper coating apparatus, denoted at 470, has an actuator mechanism 470 for controlling the slide sleeve 372 substantially constantly within a desired range in the directions indicated by the arrows E, F.

The actuator mechanism 474 includes a first bracket 476 fixedly mounted in the turning arm 368, and a second bracket 478 is tiltably mounted on the first bracket 476 (see FIG. 18). The first bracket 476 has a pair of accurate slots 480a, 480b defined therein and lying on one circle, and the second bracket 478 is adjustably fixed to the first bracket 476 by means of screws 482a, 482b inserted through the accurate slots 480a, 480b.

A rotative drive source 484 is mounted on the second bracket 478 and has a rotatable shaft 484a on which a first gear 486 is mounted. The first gear 486 is held in mesh with a second gear 488 which in turn meshes with a third gear 490 that is mounted on a drive shaft 492. The drive shaft 492 has one end projecting toward the first bracket 476 and coupled to a joint member 496 of a universal joint 494, which has another joint member 498 connected to one end of a driven shaft 500 supported on the first bracket 476. The driven shaft 500 supports thereon a fourth gear 502 operatively coupled to a rotatable shaft 506 through a gear train 504 (see FIG. 16). A substantially diamond-shaped rotatable plate 508 serving as a crank mechanism is mounted centrally on the rotatable shaft 506. The rotatable plate 508 has an outwardly projecting end connected to one end of a rod 510 which is held in engagement with an inner wall portion of the slide sleeve 372.

For displacing the paint spray guns 392, 400a, 400b back and forth in the directions of the arrows E, F through the slide sleeve 372, the rotative drive source 484 is operated to rotate the first through third gears 486, 488, 490. The driven shaft 500 is then rotated through the universal joint 494 connected to the drive shaft 492 to rotate he gear train 504 meshing with the fourth gear 502 and the rotatable plate 508 mounted on the rotatable shaft 506. The end of the rod 510 connected to the outer projecting end of the rotatable plate 508 is then angularly displaced along a circular path. The slide sleeve 372 engaging the other end of the rod 510 is now reciprocally moved transversely in the directions of the arrows E, F while being guided by the guide rail 370. The paint spray guns 392, 400a, 400b eject paint sprays to the engine hood 62, etc., of the automotive body 56 while they are being thus moved.

With the second embodiment of the present invention, the actuator mechanism 474 for moving the paint spray guns 392, 400a, 400b through the slide sleeve 372 in the directions of the arrows E, F includes the universal joint 494. The joint members 496, 498 of the universal joint 494 are inclined at an angle of α with respect to each other to form a paint coating layer of a uniform thickness on a desired area of the automotive body 56.

Figure 19:
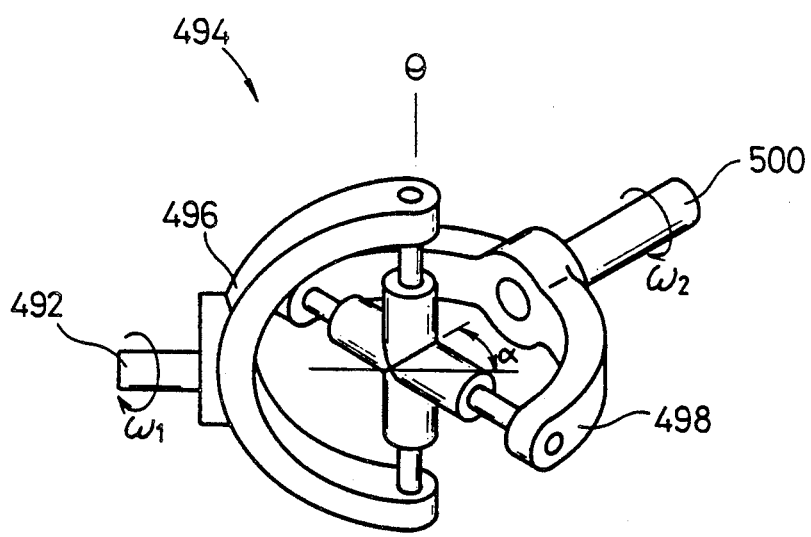
FIG. 19 is a perspective view of a universal joint in the upper coating apparatus of FIG. 16.

More specifically, as shown in FIG. 19, the joint members 496, 498 of the universal joint 494 are swingably coupled to each other for transmitting rotary motion from the drive shaft 492 to the driven shaft 500. If the drive shaft 492 and the driven shaft 500 intersect with each other at an angle of (180°−α) with respect to the horizontal direction, then it is known that the angular velocity $\omega_1$ of the drive shaft 492 and the angular velocity $\omega_2$ of the driven shaft 500 have the following relationship:

$$\omega_2 = \frac{\cos\alpha}{1 - \sin^2\theta \cdot \sin^2\alpha} \cdot \omega_1 \quad (2)$$

where θ is the angular displacement or position of the drive shaft 492 with respect to the vertical direction. Therefore, the ratio between the angular velocities $\omega_2/\omega_1$ at each angular position θ of the drive shaft 492 is given in Table 1 below.

TABLE 1

| θ° | $\omega_2/\omega_1$ |
|---|---|
| 0° | cosα |
| 490° | 1/cosα |
| 180° | cosα |
| 270° | 1/cosα |
| 360° | cosα |

Since the drive shaft 492 is rotated by the rotative drive source 484, the angular velocity $\omega_1$ of the drive shaft 492 is constant. Accordingly, each time the drive shaft 492 makes one revolution, the angular velocity $\omega_2$ of the driven shaft 500 becomes higher and lower than the angular velocity $\omega_1$.

Figure 20:
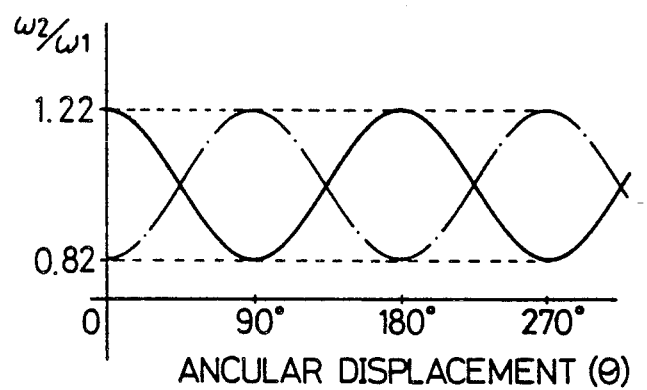
FIG. 20 is a graph showing the relationship between the ratio between the angular velocities of driver and driven shafts connected to the universal joint of FIG. 19 and the angular displacement.

If it is assumed that the angle α between the drive shaft 492 and the driven shaft 500 is set to 35°, for example, the angular velocity ratio $\omega_2/\omega_1$ and the angular displacement θ are of the relationship indicated by the dot-and-dash-line curve in FIG. 20. Therefore, by shifting the universal joint 494 from the position of FIG. 19 by a phase of 90°, i.e., by mounting the drive and driven shafts 492, 500 on the turning arm 368 so as to be inclined from each other with respect to the vertical direction, the angular velocity ratio $\omega_2/\omega_1$ and the angular displacement θ are of the relationship indicated by the solid-line curve in FIG. 20. It will now be understood that when the angular displacement θ of the drive shaft 492 is 0°, the angular velocity $\omega_2$ is higher than (i.e., 1.22 times) the angular velocity $\omega_1$, and when the angular displacement θ is 90°, the angular velocity $\omega_2$ is lower than (i.e., 0.82 times) the angular velocity $\omega_1$.

The slide sleeve 372 is displaced back and forth in the directions of the arrows E, F when the rotatable plate 508 rotates. If the rotatable plate 508 rotates at a constant angular velocity ω, then the speed $V_1$ movement of the slide sleeve 372 is indicated by a sine curve indicated by the dot and dash line in FIG. 21 (see the equation (1)).

In this embodiment, when rotary motion of the rotative drive source 484 is transmitted to the rotatable plate 508, the angular velocity $\omega_2$ of the rotatable plate 508 is controlled through the universal joint 494. Thus, the speed $V_2$ of movement of the slide sleeve 372 is plotted as a curve indicated by the solid line in FIG. 21. The speed $V_2$ of movement is thus substantially constant in a relatively wide range, and hence the paint spray guns 392, 400a, 400b can be moved at a substantially constant speed in the transverse direction of the automotive body 56.

By ejecting paint sprays from the paint spray guns 392, 400a, 400b, a paint coating having a uniform thickness is therefore formed on the automotive body 56, so that the automotive body 56 can be coated with high accuracy.

Figure 21:
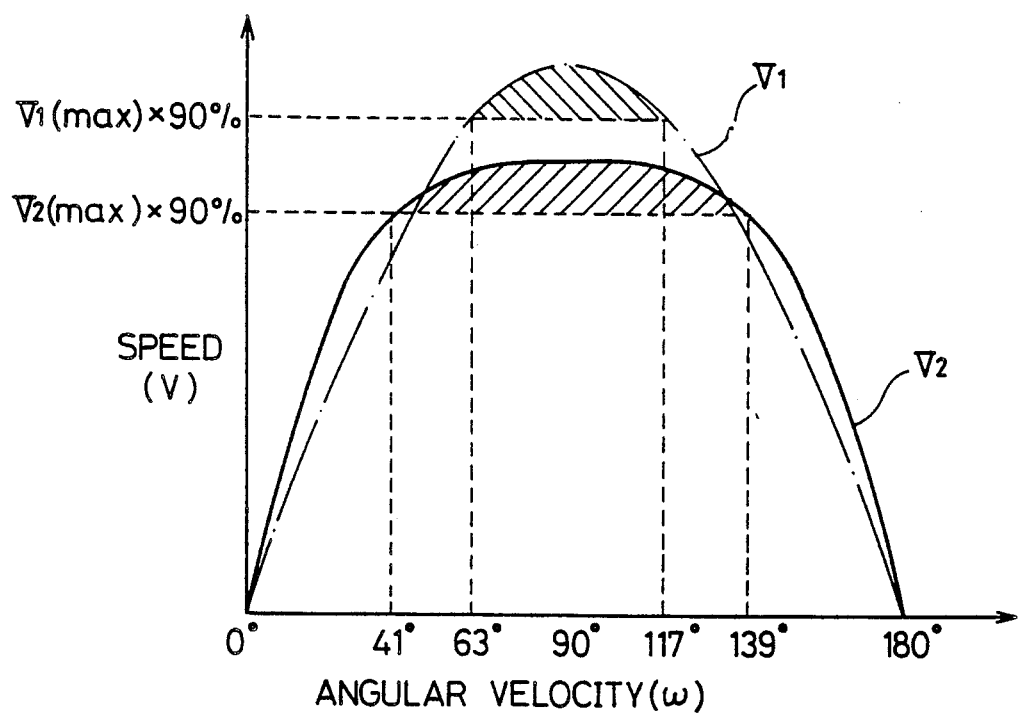
FIG. 21 is a graph showing the relationship between the speeds of movement of a paint spray gun in the conventional coating apparatus and a paint spray gun driven by the actuator mechanism of the invention.

This can also be understood from FIG. 21 which shows that the angular range which includes 90% or more of the maximum value $V_1(max)$ of the speed $V_1$ is about 55°, whereas the angular range which includes 90% or more of the maximum value $V_2(max)$ of the speed $V_2$ is about 100°.

The angle of (180°−α) formed between the drive shaft 492 and the driven shaft 500 should preferably in the range of from 135° to 150°. If the angle α were smaller than 30°, then the angular range including $V_2(max) \times 90\%$ would be reduced, failing to provide a uniform paint coating layer. If the angle α were larger than 45°, then the coated paint layer would be increased in thickness at its opposite ends and the driven shaft 500 would not be rotated smoothly.

According to the present embodiment, only the universal joint 494 is required to be disposed at a certain angular position between the rotative drive source 484 and the rotatable plate 508. The actuator mechanism 474 is simple in overall structure and can be economically manufactured.

The first actuator means 374 in the upper coating apparatus 300 according to the first embodiment may be controlled, rather than employing the actuator mechanism 474 shown in FIGS. 16 through 18, for displacing the paint spray guns 392, 400a, 400b back and forth at a desired speed in the directions indicated by the arrows E, F.

Figure 22:
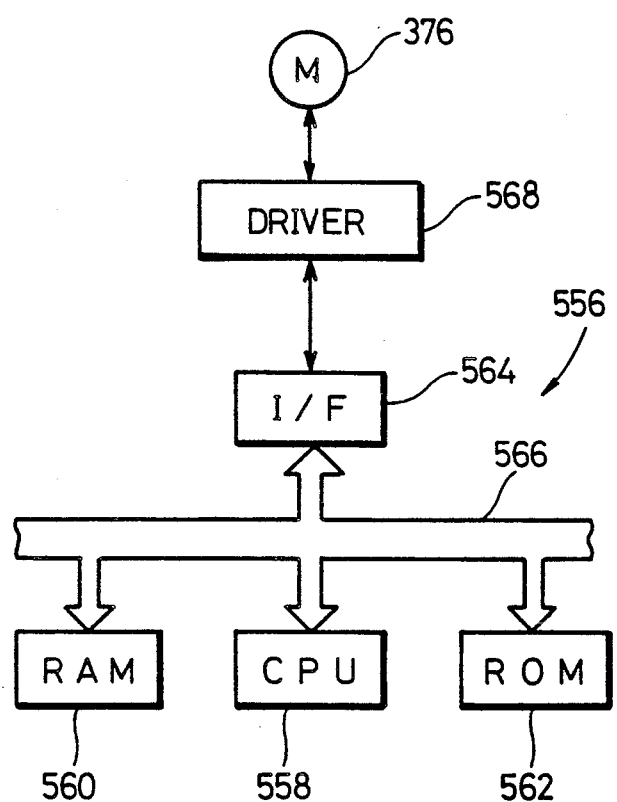
FIG. 22 is a block diagram of a controller of an actuator means in the upper coating apparatus shown in FIG. 11.

More specifically, as shown in FIG. 22, the rotative drive source 376 of the first actuator means 374 is combined with a controller 556. The controller 556 has a CPU 558, a RAM 560 for strong control data for the rotative drive source 376, a ROM 562 for storing a control program, and a driver interface 564. The RAM 560, the ROM 562, and the driver interface 564 are connected to each other by a bus line 566 comprising a data bus and a control bus. A signal is applied by the CPU 558 through a driver 568 to the rotative drive source 376 to actuate the latter according to a desired control pattern to move the slide sleeve 372 at the speed $V_2$ indicated by the solid-line curve in FIG. 21.

Therefore, the paint spray guns 392, 400a, 400b in the upper coating apparatus 300 according to the first embodiment may also be moved at a substantially constant speed $V_2$ within a desired range for forming a highly accurate paint coating layer on the automotive body 56.

Figure 23:
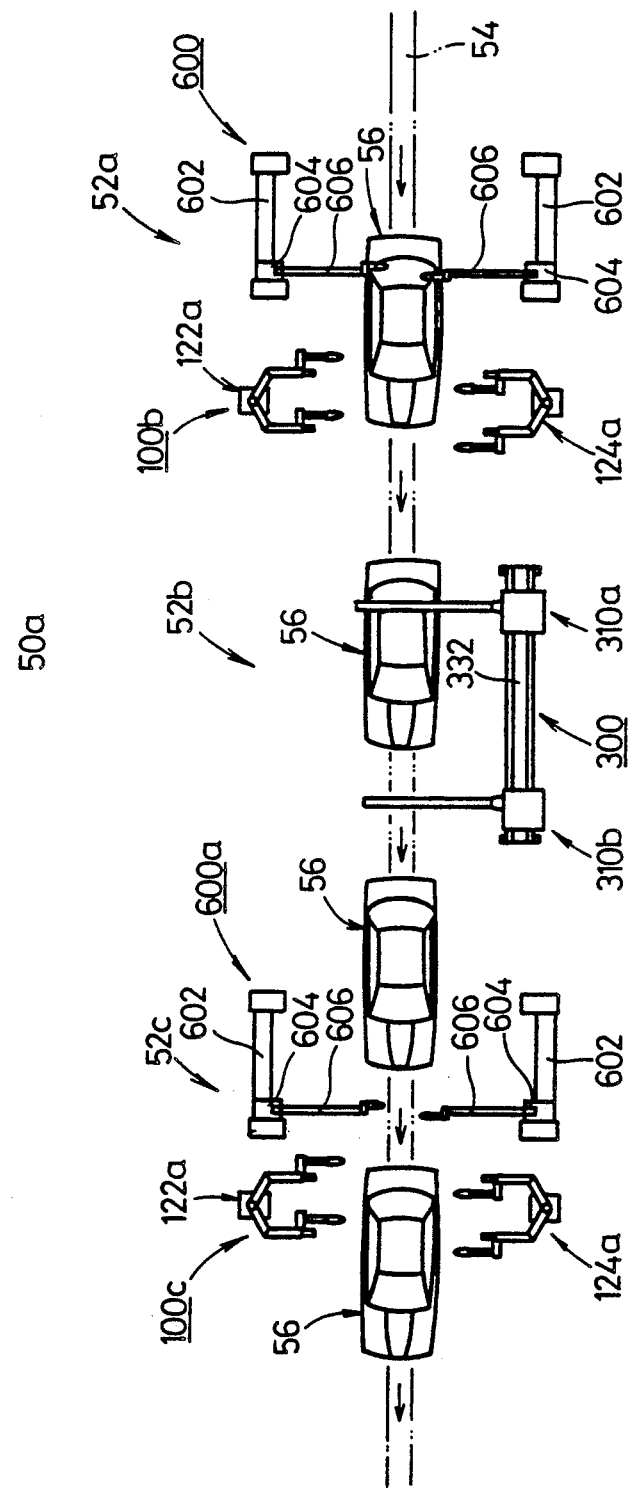
FIG. 23 is a schematic plan view of another coating line in which the coating apparatus of the invention is incorporated.

FIG. 23 shows another coating line 50a incorporating the coating apparatus for carrying out the coating method of the present invention. The coating line 50a includes a first movable coating apparatus 600 and a first side coating apparatus 100b, both disposed in a first station 52a. The first movable coating apparatus 600 has a pair of casings 604 movable back and forth along rail brackets 602, respectively. In each casing 604, there is mounted an articulated coating robot 606 of a generally known construction. The first movable coating apparatus 600 is used to coat the front pillars 64a, 64b and the rear pillars 68a, 68b of the automotive body 56. The side coating apparatus 100b includes the righthand and lefthand side coating mechanisms 122a, 124a having the first and second coating means 140a, 140b.

The second station 52b has the upper coating apparatus 300, and the third station 52c has a second movable coating apparatus 600a and a second side coating apparatus 100c.

In the coating line 50a, the automotive body 56 is delivered by the conveyor 54 successively through the first through third stations 52a through 52c, in which al necessary outer surfaces of the automotive body 56 are coated with paint layers.

The narrow front pillars 64a, 64b and the narrow rear pillars 68a, 68b are coated by the coating robots 606 which are dedicated to coat these pillars. Accordingly, excessive paint is prevented from being applied to the front pillars 64a, 64b and the rear pillars 68a, 68b. Paint can efficiently be consumed, and paint coatings are prevented from being applied to unwanted areas of the automotive body 56.

With the present invention, as described above, for coating a side panel of a workpiece such as an automotive body, a plurality of paint spray guns are spaced certain distances in the direction of delivery of the automotive body and are disposed at different heights. The paint spray guns are then oriented substantially perpendicularly to surfaces to be coated of the automotive body which is being delivered by a conveyor, and are reciprocally displaced substantially parallel to the automotive body surfaces while ejecting paint sprays to coat the surfaces. Since the side panel surfaces of the automotive body are vertically separated and coated by the respective paint spray guns at different heights which are displaced with respect to the automotive body, the interval by which each of the paint spray guns is required to traverse is reduced. The automotive body can therefore be delivered at a relatively high speed, and can be coated highly efficiently. Because the paint spray guns are spaced in the direction of feed of the automotive body, paint sprays ejected from the paint spray guns do not interfere with each other and the automotive body can be coated with high accuracy even when the electrostatic coating process is employed.

The paint spray guns are independently displaceable in respective directions by heir corresponding actuator means. When an automotive body of a different design or configuration is to be coated, the paint spray guns may be positioned in a pattern which matches the shape of a side panel of the automotive body. The single coating apparatus is therefore capable of coating automotive bodies of different types or shapes, and hence is highly versatile.

Moreover, air flows introduced into a coating booth are not disturbed by the configuration of the coating apparatus positioned in the coating booth, and paint coatings are prevented from being applied to undesirable areas of the automotive body.

When paint spray guns are displaced back and forth with respect to a workpiece by a crank mechanism, the paint spray guns can be moved at a constant speed in a predetermined range. The speed of movement of the paint spray guns with respect to the workpiece does not vary abruptly, allowing a paint coating layer having a uniform thickness to be formed on each surface of the workpiece which is to be coated. The workpiece, for example, an automotive body, can accordingly be coated with high accuracy. Since an actuator mechanism for moving the paint spray guns may comprise a universal joint, it can be manufactured quite simply and highly economically.

Although certain preferred embodiments have been shown and described, it should be understood that many changes and modifications may be made therein without departing from the scope of the appended claims.

What is claimed is:

1. An apparatus for coating a workpiece, comprising:
   at least one paint spray gun;
   a crank mechanism operatively coupled to said paint spray gun for moving the paint spray gun back and forth;
   said crank mechanism including a rod having an end coupled to said paint spray gun, and a rotatable member to which an opposite end of said rod is eccentricaly connected; and
   an actuator mechanism for varying the angular velocity of said rotatable member to control the speed at which said paint spray gun is moved back and forth, so as to be substantially constant in a predetermined range, wherein said actuator mechanism has a rotative drive source, a drive shaft connected to said rotative drive source, a driven shaft connected to said rotatable member, and a universal joint operatively interconnecting said drive and driven shafts, said drive and driven shafts being inclined at an angle from each other.

2. An apparatus according to claim 1, wherein said angle ranges substantial from 135° to 150°.

* * * * *